(12) United States Patent
Durrani et al.

(10) Patent No.: US 11,777,899 B1
(45) Date of Patent: Oct. 3, 2023

(54) HIERARCHICAL DISTRIBUTED DYNAMIC HOST CONFIGURATION PROTOCOL SYSTEM

(71) Applicant: Equinix, Inc., Redwood City, CA (US)

(72) Inventors: Muhammad Durrani, San Jose, CA (US); Syed Hashim Iqbal, San Jose, CA (US); Mustafa Arisoylu, San Jose, CA (US); Danjue Li, Dublin, CA (US); Rizwan Jamal, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 71 days.

(21) Appl. No.: 17/132,986

(22) Filed: Dec. 23, 2020

Related U.S. Application Data

(60) Provisional application No. 62/965,716, filed on Jan. 24, 2020.

(51) Int. Cl.
*H04L 61/5014* (2022.01)
*H04L 101/622* (2022.01)

(52) U.S. Cl.
CPC .... *H04L 61/5014* (2022.05); *H04L 2101/622* (2022.05)

(58) Field of Classification Search
CPC .................................................. H04L 61/5014
See application file for complete search history.

(56) References Cited

U.S. PATENT DOCUMENTS

| | | |
|---|---|---|
| 9,886,267 B2 | 2/2018 | Maheshwari et al. |
| 9,948,552 B2 | 4/2018 | Teng et al. |
| 10,129,078 B2 | 11/2018 | Kumar et al. |
| 10,243,920 B1 * | 3/2019 | Dickinson ............... H04L 45/74 |
| 2017/0054795 A1 | 2/2017 | Inoue |
| 2017/0272274 A1 | 9/2017 | Onno et al. |
| 2017/0317969 A1 * | 11/2017 | Masurekar .......... H04L 61/5061 |

OTHER PUBLICATIONS

Rosen et al., "BGP/MPLS IP Virtual Private Networks (VPNs)," Network Working Group, RFC 4364, Feb. 2006, 47 pp.

(Continued)

*Primary Examiner* — Suraj M Joshi
(74) *Attorney, Agent, or Firm* — Shumaker & Sieffert, P.A.

(57) ABSTRACT

In general, techniques are described for a hierarchical, distributed DHCP system for managing IP address assignment among distributed networks of computing devices. For example, a system may include a central DHCP server configured to manage a plurality of distributed DHCP servers, each distributed DHCP server configured to perform DHCP using IP addresses allocated from a common prefix for a tenant associated with computing devices managed by multiple DHCP servers. The central DHCP server allocates IP addresses to the distributed DHCP servers, e.g., on an on-demand basis from the common pool and may handle concurrent requests for IP addresses from distributed DHCP servers. Each of the distributed DHCP servers may store records for IP addresses and media access control (MAC) addresses for computing devices managed by that distributed DHCP server, and the DHCP servers may send these records to the central DHCP server to facilitate IP assignment coherency.

18 Claims, 16 Drawing Sheets

(56) References Cited

OTHER PUBLICATIONS

Amin et al., "Designing a hierarchical DHCP server's model to automatically provide dedicated IP address anywhere in the world with mobility," IEEE, 2011 International Conference for Internet Technology and Secured Transactions, Dec. 11-14, 2011, pp. 250-253.
Chao et al., "Hierarchical IP Distribution Mechanism for VANET," IEEE, in Proceedings of the 2nd IEEE International Conference on Ubiquitous and Future Networks (ICUFN 2010), Jun. 2010, pp. 349-354.

* cited by examiner

HIERARCHICAL DISTRIBUTED DYNAMIC HOST CONFIGURATION PROTOCOL SYSTEM

This application claims the benefit of U.S. Provisional Patent Application No. 62/965,716, entitled "HIERARCHICAL DISTRIBUTED DYNAMIC HOST CONFIGURATION PROTOCOL SYSTEM," and filed on Jan. 24, 2020, the entire content of which is incorporated herein by reference.

TECHNICAL FIELD

This disclosure relates to computing systems and, more specifically, to computer networking in distributed computing systems.

BACKGROUND

A computer network typically includes a Dynamic Host Configuration Protocol (DHCP) server configured to dynamically assign Internet Protocol (IP) addresses to the computing devices that are part of the network.

SUMMARY

In general, techniques are described for a hierarchical, distributed DHCP system for managing IP address assignment among distributed networks of computing devices. For example, a system may include a central DHCP server configured to manage a plurality of distributed DHCP servers, each distributed DHCP server configured to perform DHCP using IP addresses allocated from a common prefix for a tenant associated with computing devices managed by multiple DHCP servers. The central DHCP server allocates IP addresses to the distributed DHCP servers, e.g., on an on-demand basis from the common pool and may handle concurrent requests for IP addresses from distributed DHCP servers. Each of the distributed DHCP servers may store records for IP addresses and media access control (MAC) addresses for computing devices managed by that distributed DHCP server, and the DHCP servers may send these records to the central DHCP server to facilitate IP assignment coherency. In some cases, the distributed DHCP servers are area DHCP servers that are each located within an area and manage DHCP for computing devices housed within one or more data centers also located in the area. The areas can be geographically within a region, in which case the central DHCP server may be referred to as a regional DHCP server. Areas can be, for instance, metropolitan areas ("metros"), states, provinces, and so forth.

The techniques may provide one or more technical advantages for realizing at least one practical application. For example, the techniques may facilitate allocation of IP addresses to distributed networks from a tenant pool of IP addresses in a manner that is commensurate with usage of the IP addressed by computing devices of the distributed networks. Where the tenants are cloud tenants of a cloud computing infrastructure, the techniques may enable a cloud tenant to make use of the same IP address pool (managed by the distributed DHCP system) irrespective of locations of computing devices associated with that cloud tenant. As a result, the distributed DHCP system may insource management of the size of IP address pools per distributed network (e.g., per data center) from the tenant to the central DHCP server and increase utilization of a given subnet by avoiding mismanagement, in the form of overallocation, of IP addresses for IP assignment within distributed networks. As another example, the disclosed techniques may allow a tenant to install an application on computing devices housed in data centers across regions and to execute the application on a common layer 2 network, and in some examples, multiple different regions, by assigning IP addresses allocated from a common subnet for the layer 2 network. All computing devices regardless of region can therefore be on the same subnet. This design may enable certain functionality, particularly for tenant applications that do not inherently support Layer 3 routing. In another example, the disclosed techniques may allow a tenant to migrate a virtual machine (VM) between two different host machines while retaining its IP address, thereby increasing the stability of the tenant's system. In another example, the disclosed techniques may provide for redundant DHCP databases to allow for higher availability networking in the event of a failure at any node within the system.

In some examples, a system comprises a central dynamic host configuration protocol (DHCP) server; a first distributed DHCP server and a second distributed DHCP server communicatively coupled to the central DHCP server; a first area having DHCP operations managed by the first distributed DHCP server, the first area comprising first one or more data centers housing computing devices configured to request Internet Protocol addresses from the first distributed DHCP server; and a second area having DHCP operations managed by the second distributed DHCP server, the second area comprising second one or more data centers housing computing devices configured to request Internet Protocol addresses from the second distributed DHCP server, wherein the centralized DHCP server is configured to: obtain an association of an IP subnet with a tenant, wherein the tenant is associated with a first computing device of the computing devices in the first area and is associated with a second computing device located of the computing devices in the second area; generate a first record associating a first IP address from the common IP subnet to the first computing device and a second record associating a second IP address from the common IP to the second computing device; and send the first record to the first distributed DHCP server and the second record to the second distributed DHCP server, wherein the first distributed DHCP server is configured to assign, in response to a DHCP request from the first computing device, based on the first record, the first IP address to the first computing device, and wherein the second distributed DHCP server is configured to assign, in response to a DHCP request from the second computing device, based on the second record, the second IP address to the second computing device.

In some examples, a central dynamic host configuration protocol (DHCP) server is communicatively coupled to a first distributed DHCP server and a second distributed DHCP server, the central DHCP server comprising: processing circuitry coupled to memory, the processing circuitry configured to: obtain an association of an IP subnet with a tenant, wherein the tenant is associated with a first computing device of the computing devices in a first area and is associated with a second computing device located of the computing devices in the second area, wherein the first area has DHCP operations managed by the first distributed DHCP server and the second area has DHCP operations managed by the second distributed DHCP server; generate a first record associating a first IP address from the common IP subnet to the first computing device and a second record associating a second IP address from the common IP to the second computing device; and send the first record to the first distributed DHCP server and the second record to the second distributed DHCP server.

In some examples, a method comprises receiving, by a centralized dynamic host configuration protocol (DHCP) server, a DHCP request and a tenant identifier for a computing device housed within a data center located in a metropolitan region; assigning, by the centralized DHCP server, an IP address corresponding to a common subnet associated with the tenant identifier; and storing, by the centralized DHCP server, the IP address and a MAC address for the computing device within a distributed DHCP server for the metropolitan region.

Methods, computing devices, computing devices comprising means, and non-transitory computer-readable media configured with instructions for programming processing circuitry to perform operations are described in this disclosure.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference characters denote like elements throughout the figures and text.

DETAILED DESCRIPTION

According to techniques of this disclosure, a networked computing system may be configured with a distributed, hierarchical dynamic host configuration protocol (DHCP) system. For example, a DHCP system may include a central DHCP server with a central DHCP database and a plurality of distributed DHCP servers each having a local DHCP database. The central DHCP database may contain a tenant DHCP database. Each local DHCP database may include a local tenant database view downloaded from the central distributed DHCP database.

In some examples, a distributed DHCP system may allocate or assign overlapping IP addresses across tenants in a single instance of DHCP by using virtual network identifier (VNI) numbers to identify tenant context. The techniques and systems described herein may support subnets stretched across multiple networks, e.g. in different metropolitan areas ("metros"), to help users design high-availability (HA) applications across data centers or metro boundaries. In some examples, the techniques of this disclosure may allow DHCP to be extended to support subnets stretched across disparate geographic regions.

In some examples, a system may implement application programming interface (API) abstraction to provide a common API for a centralized business support system (BSS), in order to synchronize databases across distributed DHCP servers and abstract the complexity of DHCP HA upon failure. For example, a BSS may forward a region ID code and a metro ID code, along with a tenant and/or pool tuple, to an API server, which may communicate with a local DHCP database in order to synchronize with the global DHCP database.

In some examples, the API server may additionally be configured to run health checks for a primary instance and a secondary instance of the distributed DHCP servers which, upon detecting failure, may automatically switch DHCP server instances and abstract the DHCP switch-over from the BSS system For example, the system may implement DHCP database replication between the primary and secondary distributed DHCP instances, which, upon failure, ensures that both the primary and the secondary distributed DHCP databases contain the same information.

Figure 1:
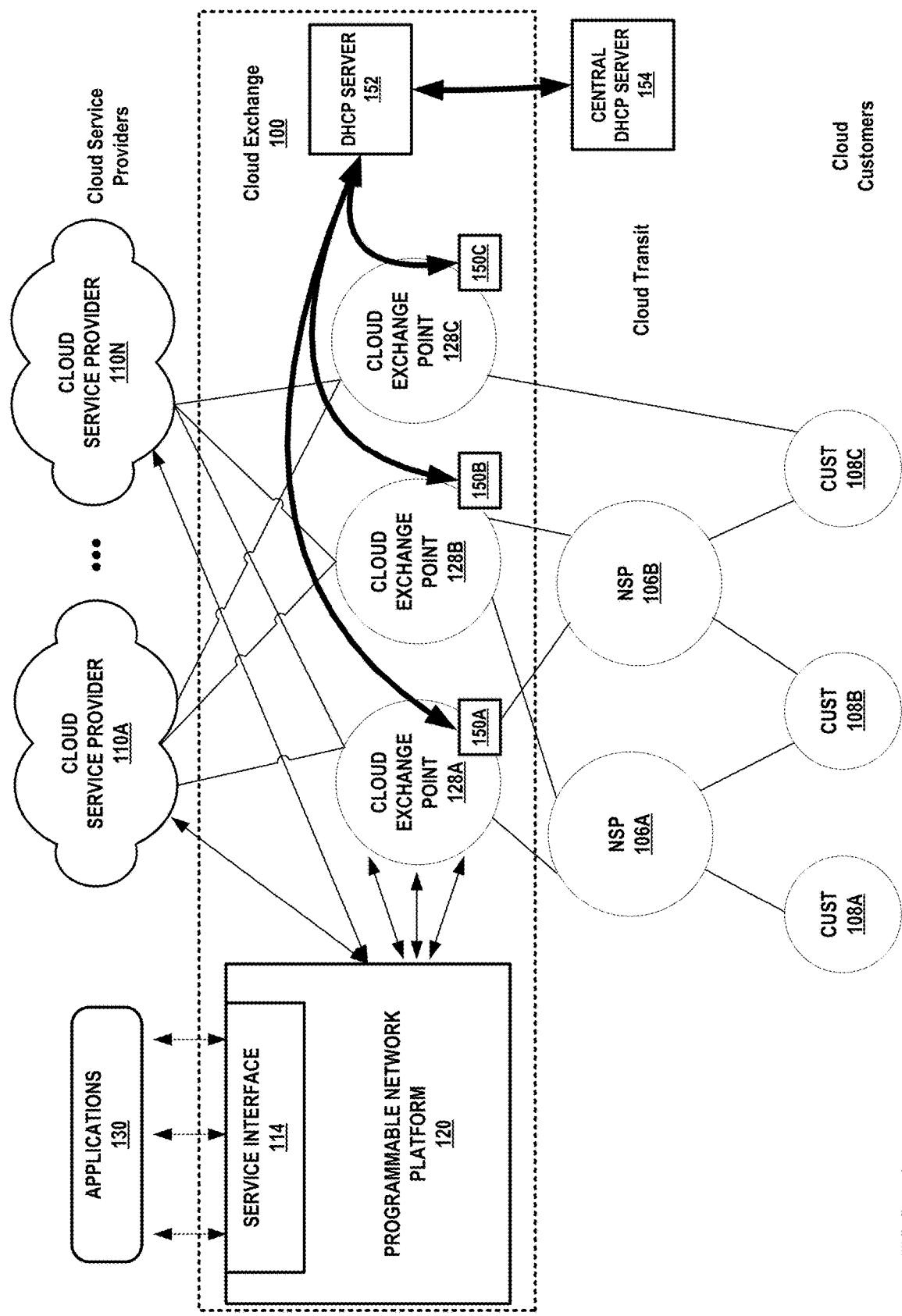
FIG. 1 is a block diagram that illustrates a conceptual view of a network system having a metro-based cloud exchange that provides multiple cloud exchange points each having a set of computing devices with IP addresses managed by a distributed DHCP system, according to techniques described herein.

FIG. 1 that illustrates a conceptual view of a network system having a metro-based cloud exchange that provides multiple cloud exchange points each having a set of computing devices with IP addresses managed by a distributed DHCP system, according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers operating computing devices 108A-108C (collectively, "customer computing devices 108") receive cloud services from multiple cloud service provider networks 110A-110N (collectively, "cloud service providers 110" or "cloud service provider networks 110"). Customer computing devices 108 may be computing devices of corresponding customer networks co-located within the corresponding data center of one of cloud exchange points 128, or customer networks that receive services via transit network service providers 106, as illustrated in FIG. 1. Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers operating computing devices 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or more devices 108. NSPs 106 may peer, at layer 3, directly with one or more cloud exchange points 128 and in so doing offer indirect layer 3 connectivity and peering to one or more customer devices 108 by which customers (e.g., operating devices 108) may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customer devices 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers would maintain on a pair-wise basis. Instead, a customer may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, one customer may have contracted with a cloud exchange provider for cloud exchange 100 to directly access layer 3 cloud services via cloud exchange points 128C. In this way, that customer receives redundant layer 3 connectivity to cloud service provider 110A, for instance. The customer at device 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. A customer at device 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer networks, all having at least one port offering connectivity within one or more of the cloud exchange points 128.

In some examples, cloud exchange 100 allows a corresponding one of customers of any network service providers (NSPs) or "carriers" 106A-106B (collectively, "carriers 106") or other cloud customers including a customer operating device 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers operating devices 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

In accordance with techniques of this disclosure, FIG. 1 includes a distributed DHCP system for managing IP address assignment among distributed networks of computing devices 150A-150C, which are in this example located in respective cloud exchange points 128. The distributed DHCP system includes a central DHCP server 154 configured to manage a plurality of distributed DHCP servers 152 for respective instances of metro-based cloud exchanges 100. While only one cloud exchange 100 and one distributed DHCP server 152 is illustrated in FIG. 1, the distributed DHCP system may include a central DHCP server 154 that manages multiple instances of DHCP server 152. Each distributed DHCP server 152 is configured to perform DHCP using IP addresses allocated from a common prefix for a tenant associated with one or more of computing devices 150 in different cloud exchanges and managed by multiple DHCP servers 152. The central DHCP server 154 allocates IP addresses to the distributed DHCP servers 152, e.g., on an on-demand basis from the common pool and may handle concurrent requests for IP addresses from distributed DHCP servers 152. Each of the distributed DHCP servers 152 may store records for IP addresses and media access control (MAC) addresses for computing devices managed by that distributed DHCP server 152, and the DHCP servers 152 may send these records to the central DHCP server 154 to facilitate IP assignment coherency. In some cases, the distributed DHCP servers 152 are area DHCP servers 154 that are each located within an area and manage DHCP for computing devices housed within one or more data centers also located in the area, such as data centers that host cloud exchange points 128. The areas can be geographically within a region, in which case the central DHCP server 154 may be referred to as a regional DHCP server. Areas can be, for instance, metropolitan areas ("metros"), states, provinces, and so forth.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers operating devices 108. The cloud exchange 100 may enable cloud customers to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer operating device 108, as described herein. A customer may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Central DHCP server 154 may execute a software interface by which another application can request IP addresses for computing devices allocated for use by a tenant. For example, one of applications 130 may be a bare metal server (BMS) service or virtualized computing environment portal that offers a user interface by which a tenant can request bare metal servers or virtualized computing environments in multiple cloud exchange points 128 located in any of cloud exchanges 100 of various metros. The application 130 may allocate the computational resources, as requested, to the tenant. The application 130 may also configure, using the software interface, the central DHCP server 154 with a subnet for the computing environments for the tenant (a computing device is an example of a computing environment, as are virtual machines and other virtualized execution environments).

Further example details of a cloud-based services exchange can be found in U.S. patent application Ser. No. 15/099,407, filed Apr. 14, 2016 and entitled "CLOUD- BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 2:
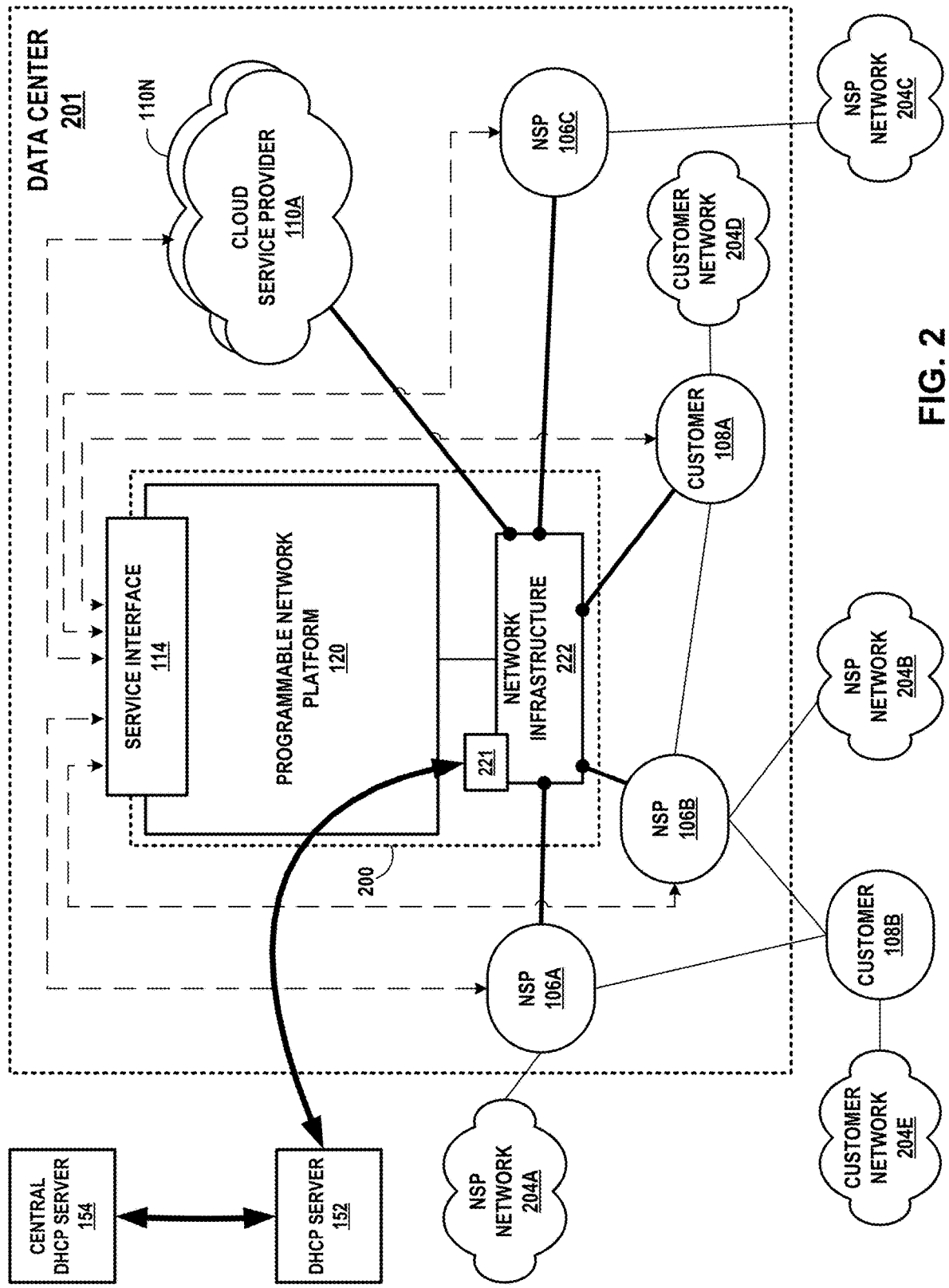
FIG. 2 is a block diagram illustrating a high-level view of a data center that provides an operating environment for a cloud-based services exchange, the data center having a set of computing devices with IP addresses managed by a distributed DHCP system according to techniques described herein.

FIG. 2 is a block diagram illustrating a high-level view of a data center 201 that provides an operating environment for a cloud-based services exchange 200, the data center 201 having a set of computing devices 221 with IP addresses managed by a distributed DHCP system according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly connected, via a layer 3 (L3) or layer 2 (L2) connection to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 110.

In accordance with techniques of this disclosure, FIG. 2 includes a distributed DHCP system for managing IP address assignment among distributed networks of computing devices, including computing devices 221, which are in this example located in data center 200 and coupled to network infrastructure 222. The distributed DHCP system is similar to the distributed DHCP system of FIG. 1 and includes a central DHCP server 154 configured to manage a plurality of distributed DHCP servers 152, each of the distributed DHCP servers 152 managing DHCP for one or more data centers. While only one data center 200 and one distributed DHCP server 152 is illustrated in FIG. 1, the distributed DHCP system may include a central DHCP server 154 that manages multiple instances of DHCP server 152.

Figure 3A:
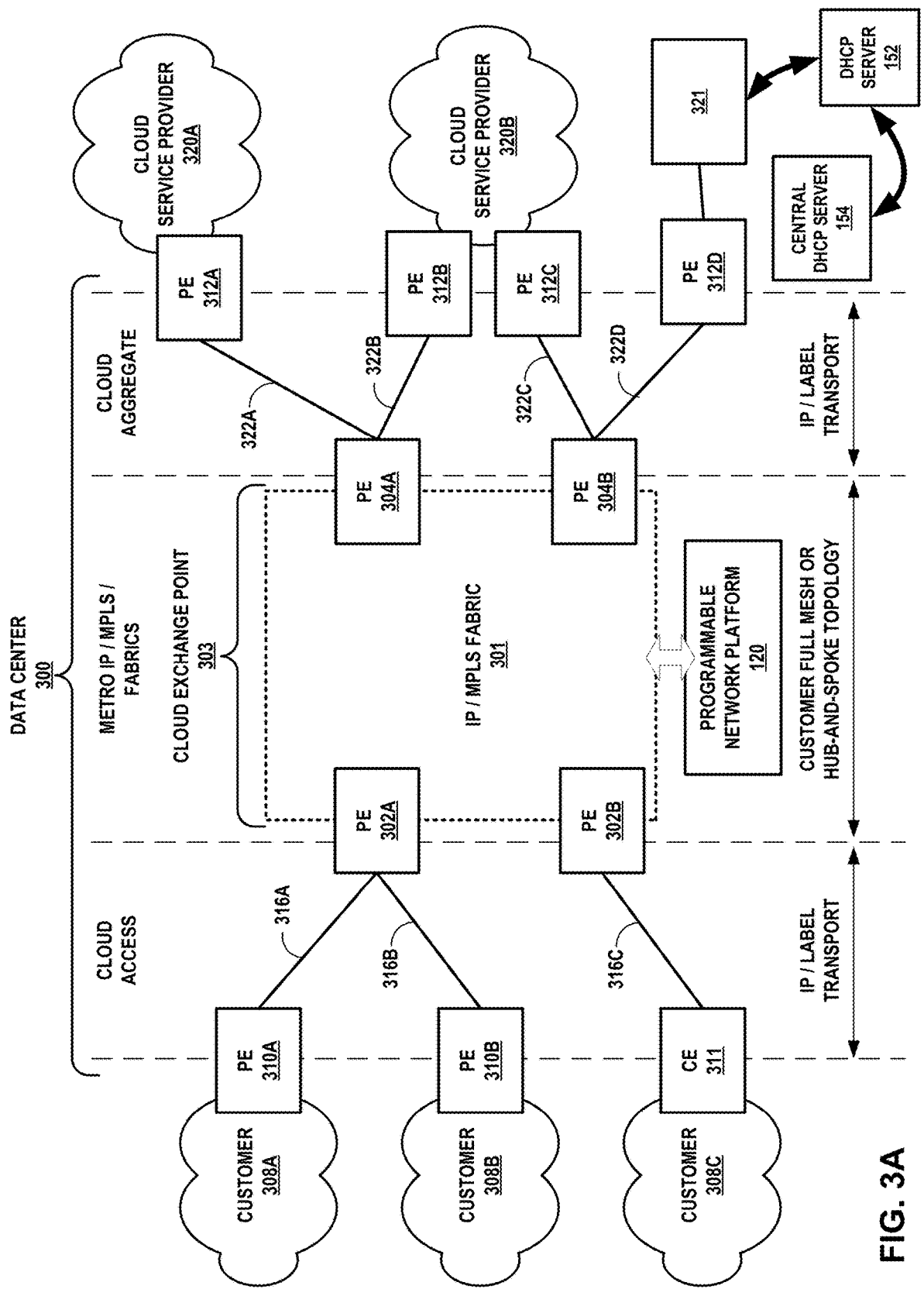
FIG. 3A and FIG. 3B are block diagrams illustrating an example of a cloud exchange point managed by a distributed DHCP system, in accordance with techniques described in this disclosure.
Figure 3B:
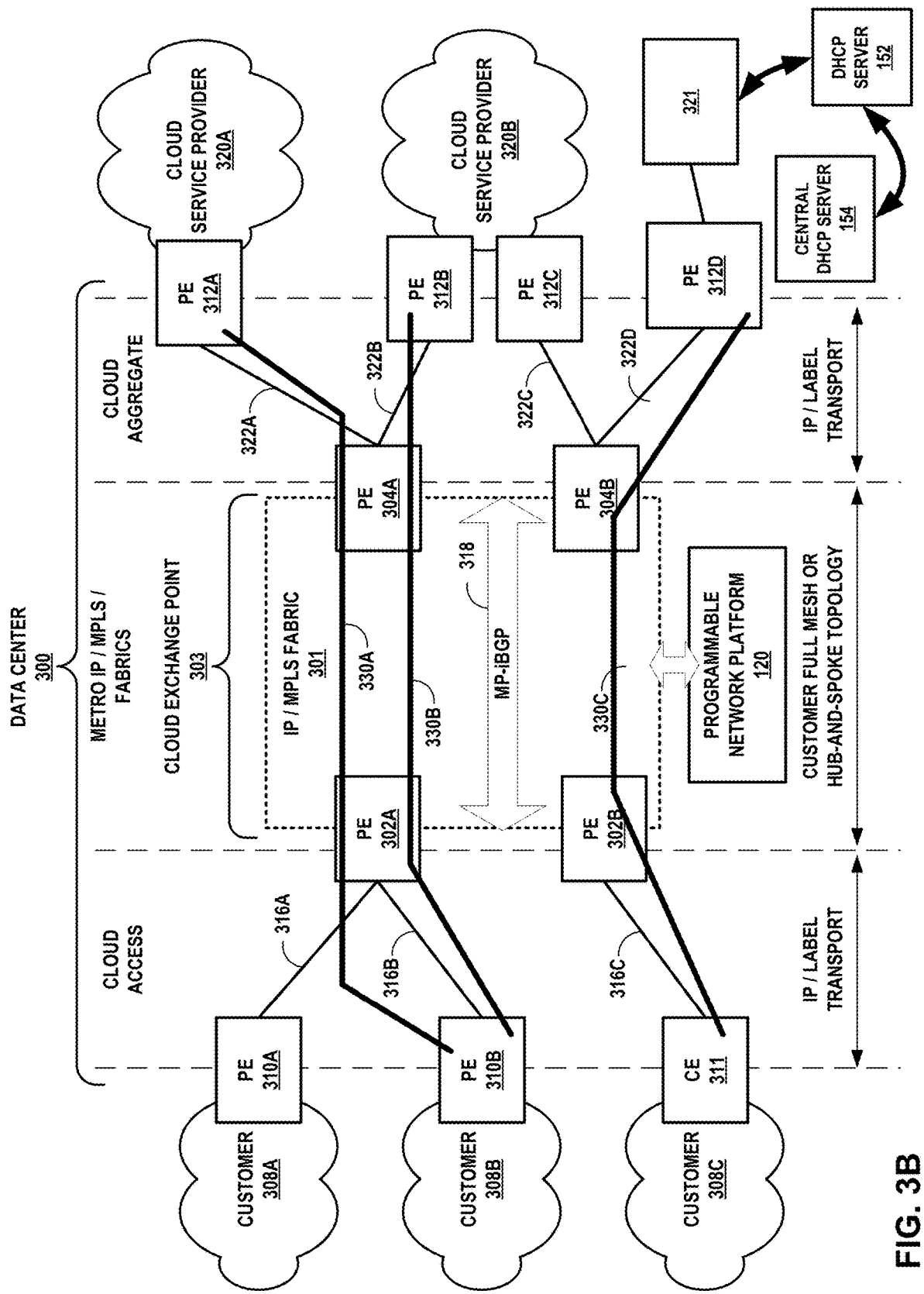

FIG. 3A and FIG. 3B are block diagrams illustrating an example of a cloud exchange point managed by a distributed DHCP system, in accordance with techniques described in this disclosure. FIG. 3A and FIG. 3B illustrate example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 might not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIG. 3A and FIG. 3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

In accordance with techniques of this disclosure, FIGS. 3A-3B include a distributed DHCP system for managing IP address assignment among distributed networks of computing devices, including computing devices 321, which are in this example coupled to an IP/MPLS fabric 301 of cloud exchange point 303. IP address assignment for computing devices described herein may include IP addresses for one or more network interfaces of a computing device, such as may be used for multiple virtual execution environments. The distributed DHCP system is similar to the distributed DHCP system of FIG. 1 and includes a central DHCP server 154 configured to manage a plurality of distributed DHCP servers 152, each of the distributed DHCP servers 152 managing DHCP for one or more instances of data center 300. While only one data center 200 and one distributed DHCP server 152 is illustrated in FIG. 1, the distributed DHCP system may include a central DHCP server 154 that manages multiple instances of DHCP server 152.

PE routers may couple to one another according to a peer model without use of overlay networks. That is, PEs 310 and PEs 312 might not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
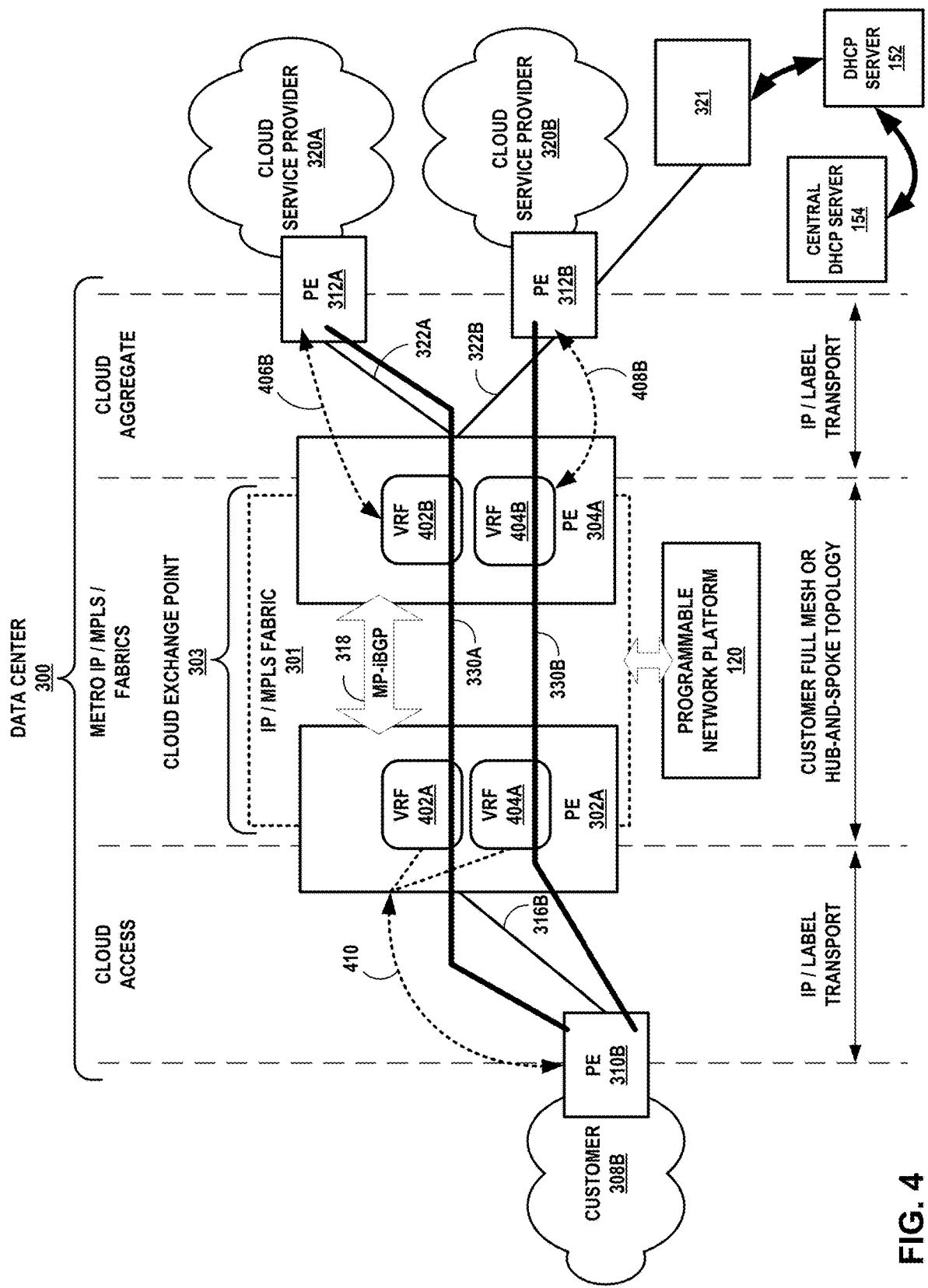
FIG. 4 is a block diagram illustrating an example of a cloud exchange point managed by a distributed DHCP system, according to techniques described herein.

FIG. 4 is a is a block diagram illustrating an example of a cloud exchange point managed by a distributed DHCP system, according to techniques described herein. FIG. 4 may be an example configuration for the data center 300 of FIGS. 3A-3B in further detail. Computing devices 321 are shown connected to PE 312B rather than PE 312D as in FIGS. 3A-3B merely for ease of illustration purposes. Data center-based cloud exchange point 303 includes routers configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIG. 3A and FIG. 3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
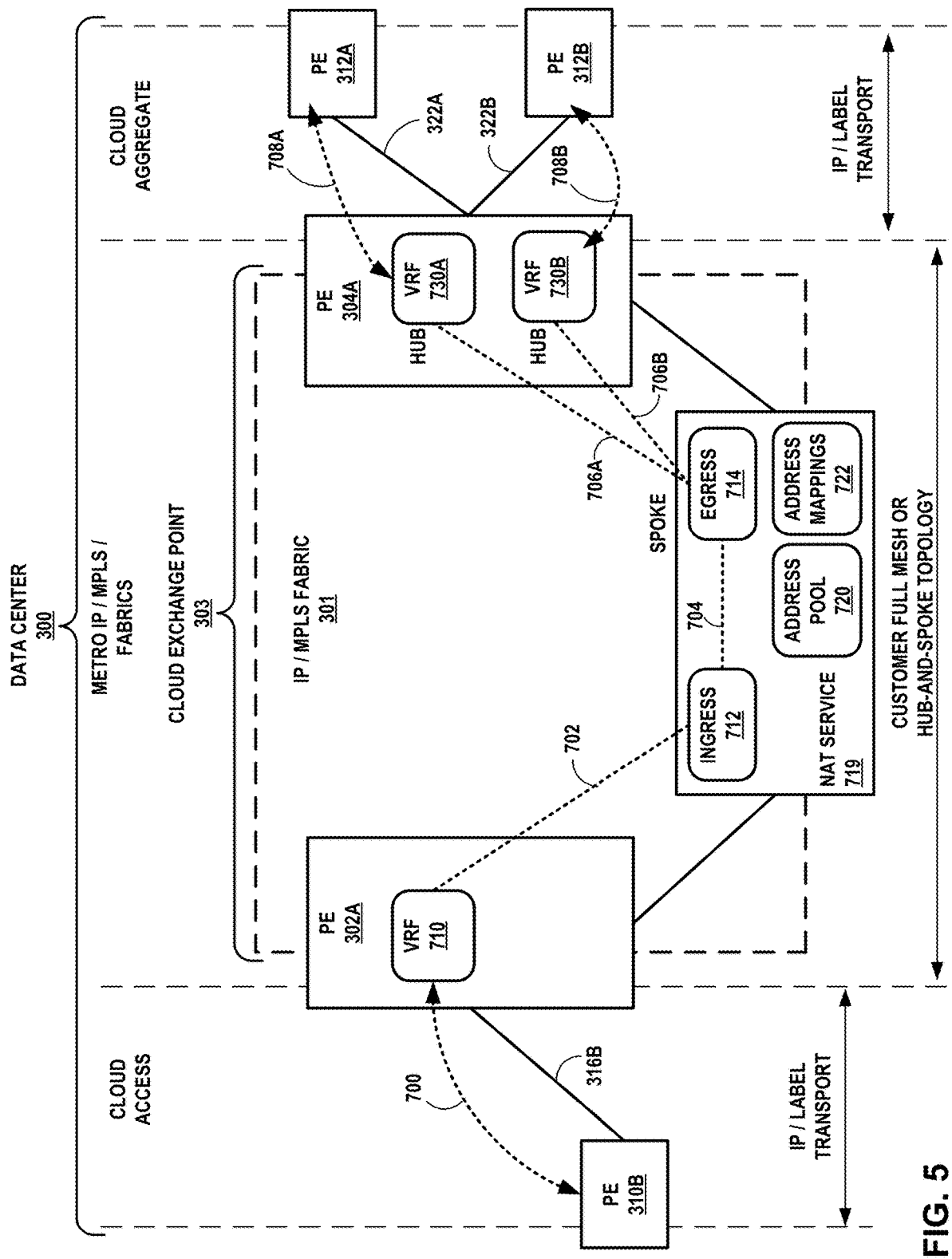
FIG. 5 is a block diagram illustrating an example of a data center-based cloud exchange point managed by a distributed DHCP system, according to techniques described herein.

FIG. 5 is a block diagram illustrating an example of a data center-based cloud exchange point managed by a distributed DHCP system, according to techniques described herein. FIG. 5 is another example configuration for the cloud exchange point 303 of FIGS. 3A-3B and 4. While not shown in FIG. 5, the cloud exchange point 303 couples to the distributed DHCP system and computing devices 321 as in FIGS. 3A-3B and 4. Cloud service provider networks 320 and customer networks 308 are not shown in FIG. 5 for ease of illustration purposes. In these examples, the data center-based cloud exchange point 303 applies a network address translation (NAT) service 719 to, in part, enforce network address separation between the cloud service layer accessible via cloud aggregation links 322 and the cloud access layer accessible via cloud access links 316.

A cloud exchange point 303 NAT device(s) that applies NAT service 719 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 719 (also referred to herein as "NAT service 719 device") may include one or more dedicated NAT appliances, one or more virtual machines executing on real server(s) and configured to apply NAT using network function virtualization (NFV), one or more service cards configured to apply the NAT service 719 and inserted in one or more of PEs 302, 304, or other device(s) inbox or out-of-box.

NAT service 719 of FIG. 5 may be implemented in one or more NAT service devices. In FIG. 5, the NAT service 719 is associated with an address pool 720 that is configured with routes for the cloud exchange point 303 autonomous system and from which the NAT service 719 may draw to automatically provision and map, for NAT purposes, to customer and/or cloud service provider routes received via peering sessions 700 and 708A-708B, respectively. The network addresses for configured routes in address pool 720 (or "NAT pool 720") may be public, private, or a combination thereof, and may represent IPv4 and/or IPv6 routes. In some examples, the network addresses are public in order to provide global uniqueness for the network addresses.

Address mappings 722 may specify one or more NAT mappings and/or network address and port translations (NAPT) that associate routes from address pool 720 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 719 may perform NAT to translate customer routes for customer network 308B (not shown in FIG. 5) and cloud exchange point 303 routes advertised to PEs 312A, 312B for aggregated cloud access. As a result, CSP networks 320 (not shown in FIG. 5) receive the cloud exchange point 303 routes drawn from address pool 720 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/ CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 719 is associated with ingress service VRF 712 ("ingress 712") and egress service VRF 714 ("egress 714") for attracting service traffic that is associated with customer network 308B and that is to be NATted. Ingress 712 and egress 714 constitute part of a customer service chain for cloud service traffic between customer network 308B and CSP networks 320A, 320B. Customer VRF 710 associated customer network 308B receives routes from customer PE 310B via peering session 700. Customer VRF 710 may be configured in a VPN-full mesh relationship with ingress service VRFs distributed in the cloud exchange point 303 (only one peering session 702 is illustrated, however).

In some examples, PE 302A distributes, for VRF 710, customer routes received via peering session 700 to the NAT service 719, which dynamically maps the customer route prefixes to cloud exchange point route prefixes drawn from address pool 720. The customer routes are installed to ingress service VRF 712. The NAT service 719 installs the mappings to address mappings 722 and installs, to egress service VRF 714, cloud exchange point routes that specify the cloud exchange point route prefixes and NAT service 719 as the next hop. In this way, NAT service 719 and more specifically egress service VRF 714 attracts downstream traffic from CSP network 320 that is intended for the customer network 308B but destined for the cloud exchange point routes installed to egress service VRF 714. Ingress service VRF 712 and egress service VRF 714 may establish peering session 704 and be configured with route targets to cause VRFs 712, 714 to leak routes to one another via iBGP, for instance.

Egress service VRF 714 may operate as a spoke VRF for corresponding hub VRFRs 730A, 730B in a manner similar to VRFs of PE 302A operating as spoke VRFs in the example of FIG. 4. That is, egress service VRF 714 and VRFs 730A, 730B are configured with reciprocal route targets such that egress service VRF 714 advertises routes for the egress service VRF 714 for installation to VRFs 730A, 730B, while VRFs 730A, 730B advertise routes for corresponding CSP networks 320A, 320B to egress service VRF 714. NATted upstream service traffic destined to any of CSP networks 320A, 320B passes through corresponding hub VRFs 730A, 730B. Each of peering sessions 706A, 706B may be used in this way to create hub-and-spoke VPNs for the respective CSP networks 320A, 320B.

PEs 302, 304 may establish tunnels with the NAT service 719 device. Routes exchanged via peering sessions 702 and 706A, 706B may include labeled routes for implementing MPLS/BGP IP-VPNs according to RFC 4364, incorporated above.

Cloud exchange point 303 may forward and apply NAT service 719 to downstream service traffic from PE 312A, intended for customer network 308A, as follows. PE 304A receives a service packet on aggregation link 322A. The packet has a destination address that is a cloud exchange point 303 address drawn from address pool 720. VRF 730A associated with aggregation link 322A stores a route for the destination address that specifies an address for the NAT service 719 device, and PE 304A tunnels the packet using VRF 730A to the NAT service 719 device for application of the NAT service.

NAT service 719 uses address mappings 722 dynamically provisioned for routes for customer network 308A and received from PE 302A to perform NAT and replace the service packet destination address with a destination address in customer network 308A. The NAT service 719 device may determine in ingress service VRF 712 the labeled route to PE 302A (the label identifying VRF 710) and tunnel the modified service packet PE 302A, which may identify VRF 710 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

Figure 6:
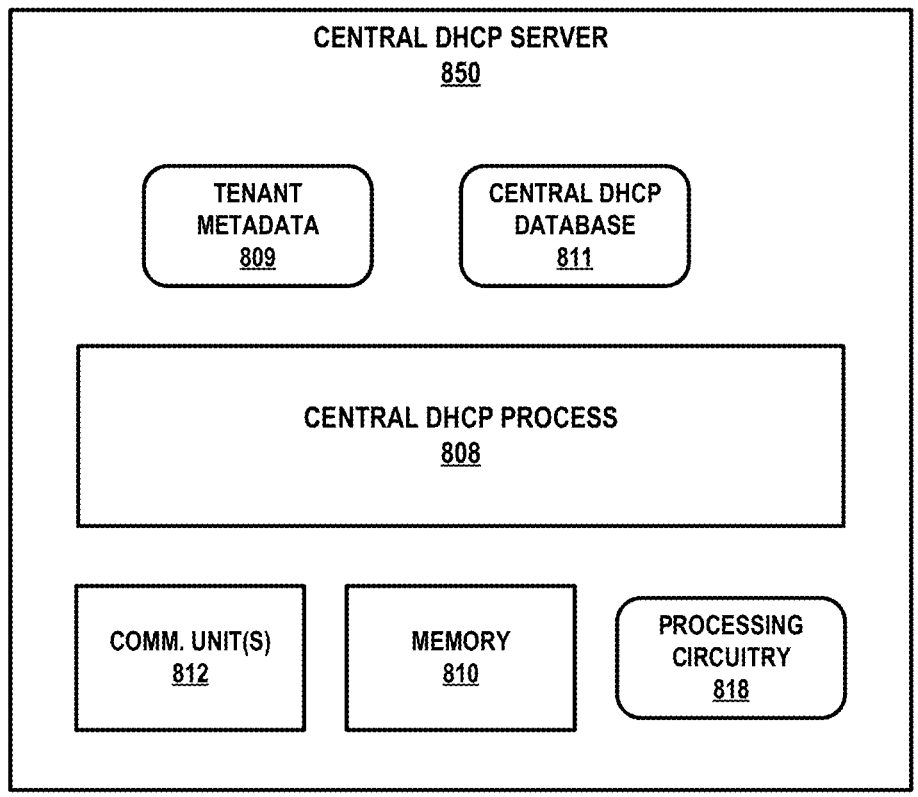
FIG. 6 is a block diagram illustrating an example DHCP server and central DHCP server, in accordance with one or more aspects of the present disclosure.
Figure 6:
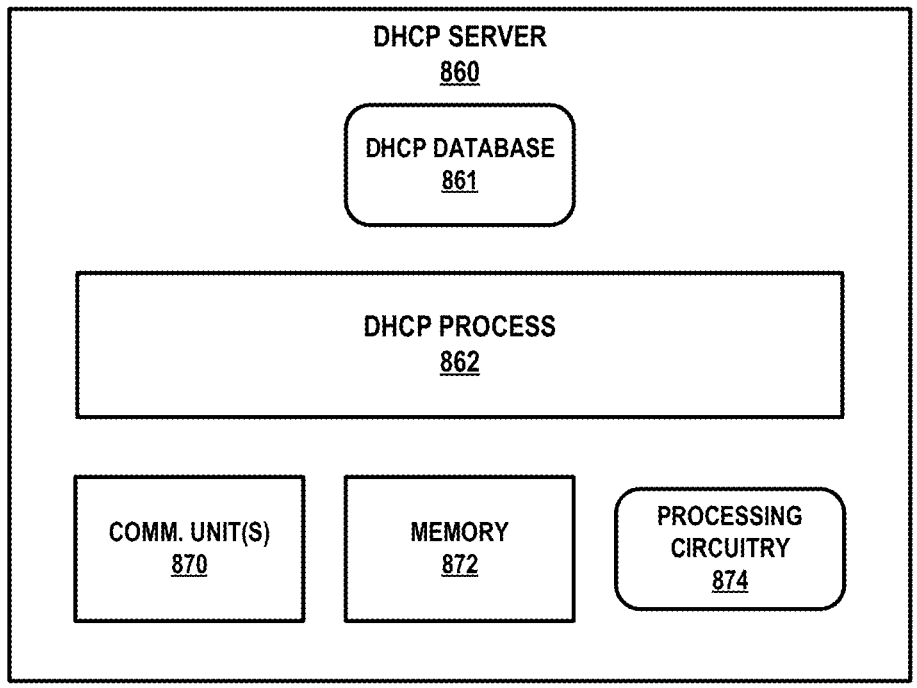

FIG. 6 is a block diagram illustrating an example distributed DHCP server and an example central DHCP server, in accordance with one or more aspects of the disclosure. Each of central DHCP server 850 and DHCP server 860 may represent one or more real and/or virtual computing devices and may be located on-site; in one of the data centers; or in a public, private, or hybrid cloud.

Central DHCP process 808 represents software configured for execution by the central DHCP server 850 computing environment, including processing circuitry 818, to perform operations attributed to any of the central DHCP servers described herein. DHCP process 808 represents software configured for execution by the DHCP server 860 computing environment, including processing circuitry 818, to perform operations attributed to any of the central DHCP servers described herein.

Central DHCP server 850 includes memory 810, one or more communication units 812, and processing circuitry 818. Memory 810 may store information for processing during operation. In some examples, memory 810 may include temporary memories, meaning that a primary purpose of the one or more storage devices is not long-term storage. Memory 810 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 810, in some examples, also include one or more computer-readable storage media. Memory 810 may be configured to store larger amounts of information than volatile memory. Memory 810 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 810 may store program instructions and/or data associated with one or more of the modules or processes described in accordance with one or more aspects of this disclosure.

Processing circuitry 818 and memory 810 may provide an operating environment or platform for the stack, which may be implemented as software, but may in some examples include any combination of hardware, firmware, and software. Processing circuitry 818 may execute instructions and memory 810 may store instructions and/or data of one or more modules. The combination of processing circuitry 818 and memory 810 may retrieve, store, and/or execute the instructions and/or data of one or more applications, modules, or software. Processing circuitry 818 and memory 810 may also be operably coupled to one or more other software and/or hardware components, including, but not limited to, one or more of the components illustrated in FIG. 6.

One or more communication units 812 by transmitting and/or receiving data, and may operate, in some respects, as both an input device and an output device. In some examples, communication units 812 may communicate with other devices over a network. In other examples, communication units 812 may send and/or receive radio signals on a radio network such as a cellular radio network. Examples of communication units 812 include a network interface card (e.g. such as an Ethernet card), an optical transceiver, a radio frequency transceiver, a GPS receiver, or any other type of device that can send and/or receive information. Other examples of communication units 812 may include Bluetooth®, GPS, 3G, 4G, and Wi-Fi® radios found in mobile devices as well as Universal Serial Bus (USB) controllers and the like.

Central DHCP server 860 includes memory 872, one or more communication units 870, and processing circuitry 874. Memory 872 may store information for processing during operation. In some examples, memory 872 may include temporary memories, meaning that a primary purpose of the one or more storage devices is not long-term storage. Memory 872 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 872, in some examples, also include one or more computer-readable storage media. Memory 872 may be configured to store larger amounts of information than volatile memory. Memory 872 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 872 may store program instructions and/or data associated with one or more of the modules or processes described in accordance with one or more aspects of this disclosure.

Processing circuitry 874 and memory 872 may provide an operating environment or platform for the stack, which may be implemented as software, but may in some examples include any combination of hardware, firmware, and software. Processing circuitry 874 may execute instructions and memory 872 may store instructions and/or data of one or more modules. The combination of processing circuitry 874 and memory 872 may retrieve, store, and/or execute the instructions and/or data of one or more applications, modules, or software. Processing circuitry 874 and memory 872 may also be operably coupled to one or more other software and/or hardware components, including, but not limited to, one or more of the components illustrated in FIG. 6.

One or more communication units 870 by transmitting and/or receiving data, and may operate, in some respects, as both an input device and an output device. In some examples, communication units 870 may communicate with other devices over a network. In other examples, communication units 870 may send and/or receive radio signals on a radio network such as a cellular radio network. Examples of communication units 870 include a network interface card (e.g. such as an Ethernet card), an optical transceiver, a radio frequency transceiver, a GPS receiver, or any other type of device that can send and/or receive information. Other examples of communication units 870 may include Bluetooth®, GPS, 3G, 4G, and Wi-Fi® radios found in mobile devices as well as Universal Serial Bus (USB) controllers and the like.

Central DHCP database 811 operates as "ground-truth" for the distributed DHCP system that includes central DHCP server 850 and one or more distributed DHCP servers (e.g., DHCP serer 860). Central DHCP database 811 stores records of tenant-subnet associations, tenant-pool associations, IP address assignment, and/or other DHCP-related data. Central DHCP database 811 may also store IP address lease information, MAC address information, gateway data, and/or other network configuration-related or DHCP-related data. Central DHCP process 808 applies operations described in this disclosure to read from and store data to central DHCP database 811.

Tenant metadata 809 may include data usable by central DHCP process to allocate IP addresses from subnets associated with tenants to distributed DHCPs for assignment to computing devices managed by the distributed DHCPs. This data is described in further detail below. While illustrated as separate data structures, central DHCP database 811 may include tenant metadata 809. Instances of central DHCP database 811 may alternatively be referred to herein as global DHCP databases in that a central DHCP server 850 may manage be the global manager for a particular distributed DHCP system.

DHCP database 861 stores records of IP address assignment and/or other DHCP-related data. DHCP database 811 may also store IP address lease information, MAC address information, gateway data, and/or other network configuration-related or DHCP-related data. Example DHCP records stored by DHCP database 861 are described in further details below. DHCP process 862 applies operations described in this disclosure to read from and store data to DHCP database 861. Instances of DHCP database 861 may alternatively be referred to herein as "metro," "local," or "area" DHCP databases in that a distributed DHCP server may manage computing devices geographically-located in a metropolitan area, locality, or other area for the distributed DHCP system.

Figure 7:
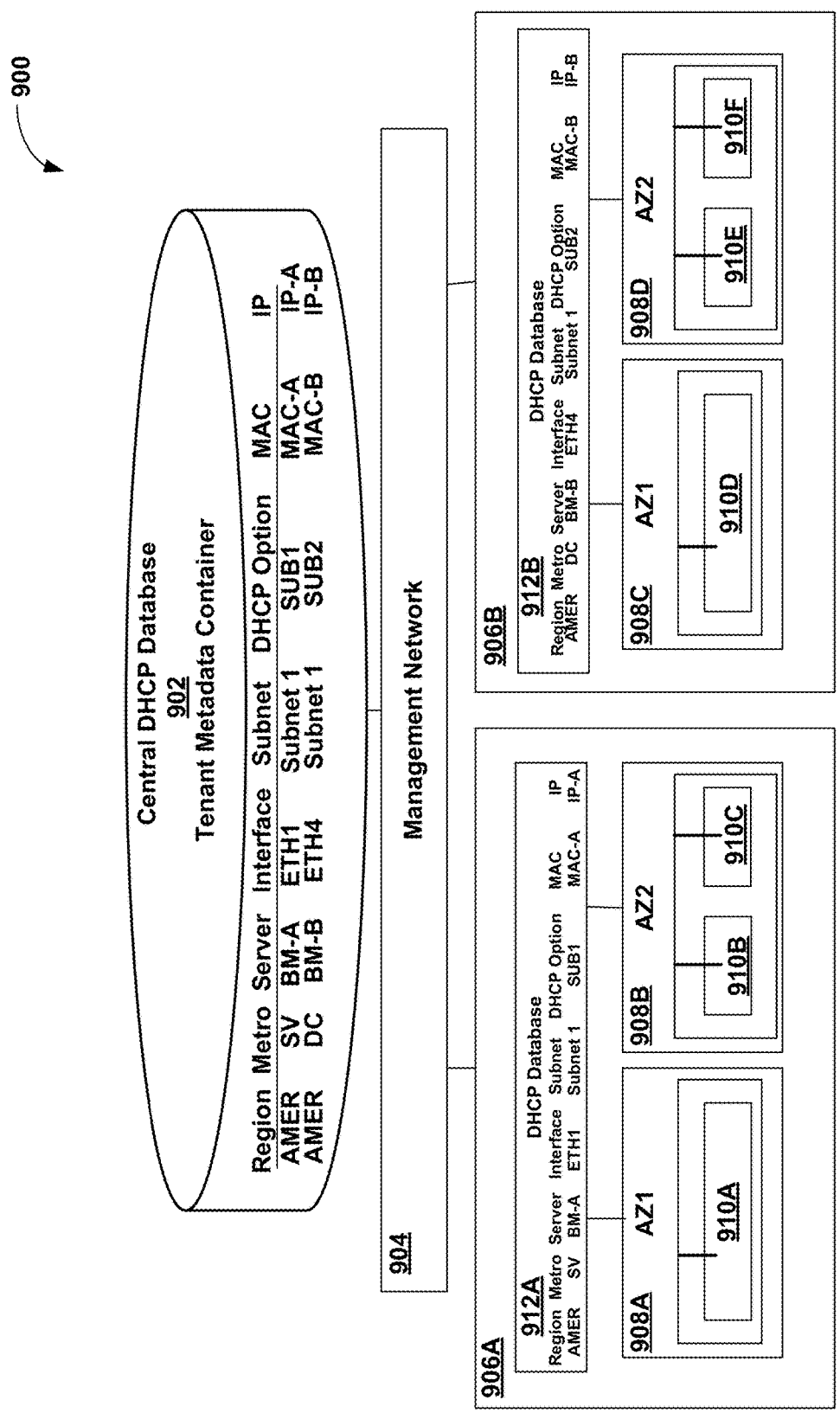
FIG. 7 is a block diagram illustrating an example system, in accordance with one or more aspects of the present disclosure.

FIG. 7 is a block diagram illustrating an example system, in accordance with one or more aspects of the present disclosure. System 900 may be an example of a network system having a system of metro-based cloud exchanges. System 900 includes a central DHCP server and database 902 (hereinafter, "central DHCP 902"); management network 904; a plurality of metropolitan regions 906A-906B (collectively, "metros 906"); a plurality of data centers 908A-908D (collectively "data centers 908") located within metros 906; a plurality of computing devices or computing servers 910A-910F (collectively, "servers 910") housed within data centers 908; and a respective distributed DHCP database 912A-912B (collectively, "DHCPs 912") located within each metro 906.

In some examples, central DHCP 902 may include a Dynamic Host Configuration Protocol (DHCP) server configured to dynamically assign IP addresses to the devices connected to networked computing system 900. Although central DHCP 902 is referred to in this disclosure as "global" or "central," it is to be understood that, in some examples, central DHCP 902 may include just one instance of a plurality of "regional" DHCP servers, wherein each distributed DHCP server is configured to dynamically manage IP addresses for a plurality of networked computing devices 910 located across a vast or significant geographic region, such as an entire country or continental region. As one example, as shown in FIG. 7, central DHCP database 902 may be assigned a regional identification code ("regionID") of "AMER," referring to the geographic region of the United States of America, or in some examples, North America and/or South America in its entirety.

In accordance with some examples of this disclosure, central DHCP 902 is configured to manage IP addresses for any or all of the networked computing devices or servers 910 located within the managed geographic region, such that any two servers may be designated as part of the same subnet, regardless of their physical geographic locations or local area networks. This design may be advantageous in that it allows a user or tenant to install an application across any two or more servers 910 across the network, even when the application does not inherently support Layer 3 routing of data packets across the network.

As detailed further below, management network 904 is configured to manage a distributed hierarchy of DHCP servers for the distributed DHCP system. More particularly, management network 904 may be configured to manage the distribution of data between central DHCP 902 and each of a plurality of metro DHCPs 912. For example, management network 904 may be configured to manage DHCP requests and responses between central DHCP 902 and metro DHCPs 912. As another example, management network 904 may be configured to download copies of MAC addresses and IP addresses from central DHCP 902 to memory storage within metro DHCPs 912, for each of the servers 910 located within the metro region 906 managed by the respective metro DHCP 912. In some examples, management network 904 may include one or more systems and servers. For example, management network 904 may include an orchestrator or orchestration system. In some examples, management network 904 may include an application programming interface (API) abstraction server. In some examples, management network 904 may include a centralized business support system ("BSS") configured to use API abstraction to synchronize the central DHCP 902 with the plurality of metro DHCPs 912, to abstract a complexity of DHCP high availability ("HA") upon failure.

As described further above with respect to FIG. 1, each of metros 906 may include a common metropolitan geographic region (e.g., "metro region"). For example, each metro 906 may include a city or group of nearby cities, such as a major city and its suburbs. For example, as shown in FIG. 7, metro 906A may include the metropolitan region of Silicon Valley, Calif., having a metro identification code ("metroID") of "SV." As another example, as shown in FIG. 7, metro 906B may include the metropolitan region of Washington, D.C., having a metroID of "DC."

Data centers 908 may include examples of exchange points 128 of FIG. 1, data center 201 of FIG. 2, or data center 300 of FIGS. 3-5. Each of data centers 908 may include a discrete building, located within one of metros 906, configured to house one or more networked computing devices or servers 910. In some examples, when a data center 908 includes one or more servers 910 that is available for rent, lease, or other use by a customer, client, tenant, or other user, the data center 908 may also be referred to as an "Availability Zone." For example, as shown in FIG. 7, each of data centers 908A and 908C may be assigned the ID code "AZ1" for "Availability Zone 1" within its respective metro 906A. Similarly, as shown in FIG. 7, each of data centers 908B and 908D may be assigned the ID code "AZ2" for "Availability Zone 2" within its respective metro 906B. In some examples, a data center 908 may also be referred to as an International Business Exchange ("MX") or co-location facility or interconnection facility.

Servers 910 include any number and type of networked computing devices (e.g., hosts) housed within one of data centers 908. Each server 910 may include a designated amount of memory and one or more processors configured to execute programming instructions, such as received by user input and/or retrieved from memory. In some examples, each server 910 may include a plurality of Ethernet ports or interfaces (not shown in FIG. 7). Servers 910 are examples of computing devices that require IP address assignment and management.

In some examples, the computing power of servers 910 may be available for rent or lease by a tenant or other user, such that the user may install one or more user applications or programs. For example, a user may specify a desired and/or required amount of computing power, such as a number of processing cores, an amount of memory, or an amount of CPU for the user's intended purpose. The user may also specify a desired geographical location of the servers 910, such as one or more metros 906, or in some examples, one or more specific data centers 908. Based on the user's requirements and constraints, one or more servers 910, or interfaces of servers 910, may be allocated to the particular user or tenant. Tenants leased a computing device or computing resources therefore are associated with the computing device.

In accordance with some examples of this disclosure, system 900 defines a distributed, hierarchical DHCP system. For example, in addition to central DHCP database 902 managed by a central DHCP server, system 900 additionally includes a plurality of DHCP databases 912 managed by distributed DHCP servers. Each DHCP database 912 is managed by a DHCP server allocated to (e.g., in data communication with) all of the data centers 908 located within a common metro 906. Each DHCP 912 may provide a metro-level DHCP view of the devices (e.g., servers 910) located within a specific metro 906. For example, each metro DHCP 912 may be configured to download and store, from central DHCP 902, a copy of all of the MAC addresses and IP addresses for each of the servers 910 located within the common metro 906. As one example, as shown in FIG. 7, DHCP 912A may be configured to download and store all of the MAC addresses and IP addresses for servers 910A-910C located within metro 906A. Similarly, metro DHCP 912B may be configured to download and store all of the MAC addresses and IP addresses for servers 910D-910F located within metro 906B. DHCPs 912 may provide a number of technical advantages. For example, in some examples, DHCPs 912 may locally provide some of the functionality of central DHCP 902, providing for higher availability of system 900. As another example, DHCPs 912 may function as redundant backups for central DHCP 902, ensuring retained functionality for system 900 in the event of a failure. Further advantages will become apparent with reference to the additional FIGS. below.

Figure 8:
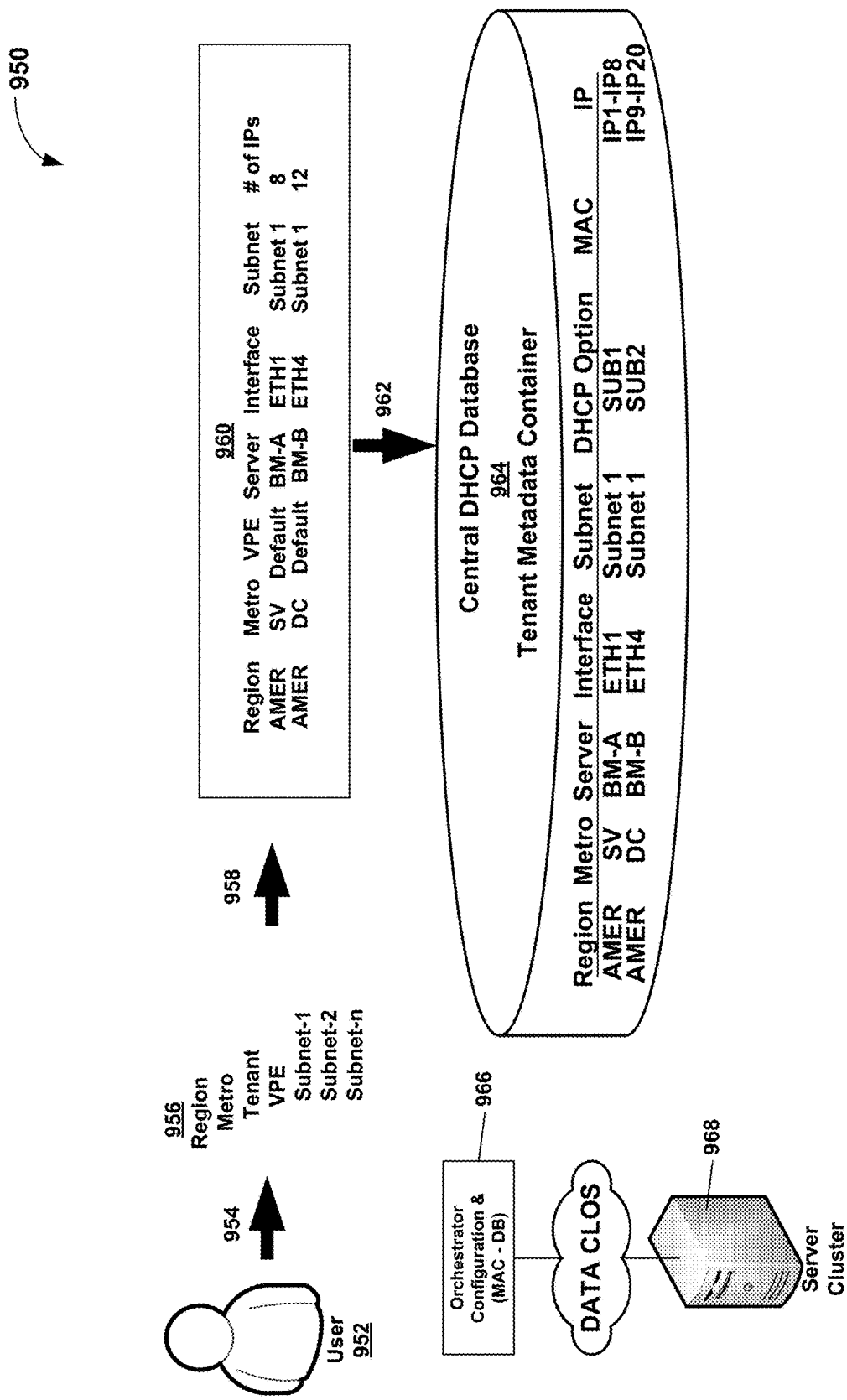
FIG. 8 is a conceptual flow diagram depicting a method of IP address assignment, in accordance with techniques of this disclosure.

FIG. 8 is a conceptual flow diagram 950 depicting a method of IP address assignment, in accordance with techniques of this disclosure. A user 952, such as a client, customer, or tenant of a cloud-computing service, logs onto a user experience (UX) portal and submits a set of user criteria 956 as user input (954). For example, user 952 may submit a set of constraints or requirements for a computing service, such as a desired regional geographic location for one or more servers (e.g., country), a desired metropolitan location for the servers, and a tenant identification designating one or more specific user groups, such that the system may designate a unique subnet for each user group. For example, a single user or tenant may designate multiple sub-tenants, such as for an engineering group, a management group, and/or a sales group, as examples. In some examples, the user may also indicate a virtual private edge (VPE). If the user does not designate a subnet for the VPE, the user may be assigned a default subnet for the VPE, such as 10.1.1.0/16. In some examples, the user may additionally select one or more specific servers within the data centers. For example, the user may select one or more particular servers based on a location, a memory size and/or processing power of the individual servers. Then for each interface of the one or more servers, the user may request that the system assign an IP address from a particular designated subnet. For example, as shown in the example of FIG. 8, the user may request, for interface ETH-1 of server BM-A and for interface ETH-4 of server BM-B, an IP address be assigned from designated Subnet 1 (958). The user may perform this action for different metros, here "SV" and "DC," to assign a same subnet, here "Subnet-1", for the tenant for DHCP use in different metros for assignment to computing devices located in those different metros. As a result, the computing devices will be on the same subnet. This may be particularly advantageous for tenant networks that do not include a layer 3 routing device for inter-metro communications and seek to communicate on a layer 2 network.

Once the user submits this information to the user portal, the portal at the back end may communicate the user input to a central DHCP database (960). For example, the portal may submit the user information in the form of a request 962 containing the user constraints 956.

For each computing device, the central DHCP server assigns one or more IP addresses from the subnet designated by the user for the computing device and creates a server record for the computing device. Two server records are illustrated for two bare metal servers, BM-A and BM-B.

The central DHCP server pushes each of these records to the appropriate distributed DHCP server for the metro in which each server is located, and the distributed DHCP servers store the records in the respective DHCP databases. Thereafter, in response to a DHCP Discovery from one of the servers, the distributed DHCP server responds in accordance with the record. That is, the distributed DHCP server may map the source MAC address for the interface in the DHCP Discovery to the DHCP record in DHCP database and issue a DHCP Offer with the IP address assigned by the central DHCP server for the interface of the server. As an example with respect to FIG. 7, the "AZ1" server with interface "eth1" may broadcast a DHCP Discover from the interface with source MAC having value MAC-A. The distributed DHCP server for the metro receives the DHCP Discover and maps MAC-A to IP-A in the DHCP database 912A, then returns a DHCP Offer to AZ1 with IP-A for eth1. These devices may then complete the DHCP operation to complete the IP assignment to eth1. A DHCP request may refer to a DHCP Request message or a DHCP Discovery message. A DHCP response may refer to a DHCP Offer or DHCP Acknowledge message.

In some examples, each server may include a respective network interface card (NIC). When a NIC boots up, it may register its MAC address to an orchestrator 966 that maintains a MAC database for all of the server cluster nodes. For example, during an API call, the system may provide the orchestrator with a name of a particular server, and in return, the orchestrator may return the MAC address corresponding to each of the interfaces for that server.

Figure 9A:
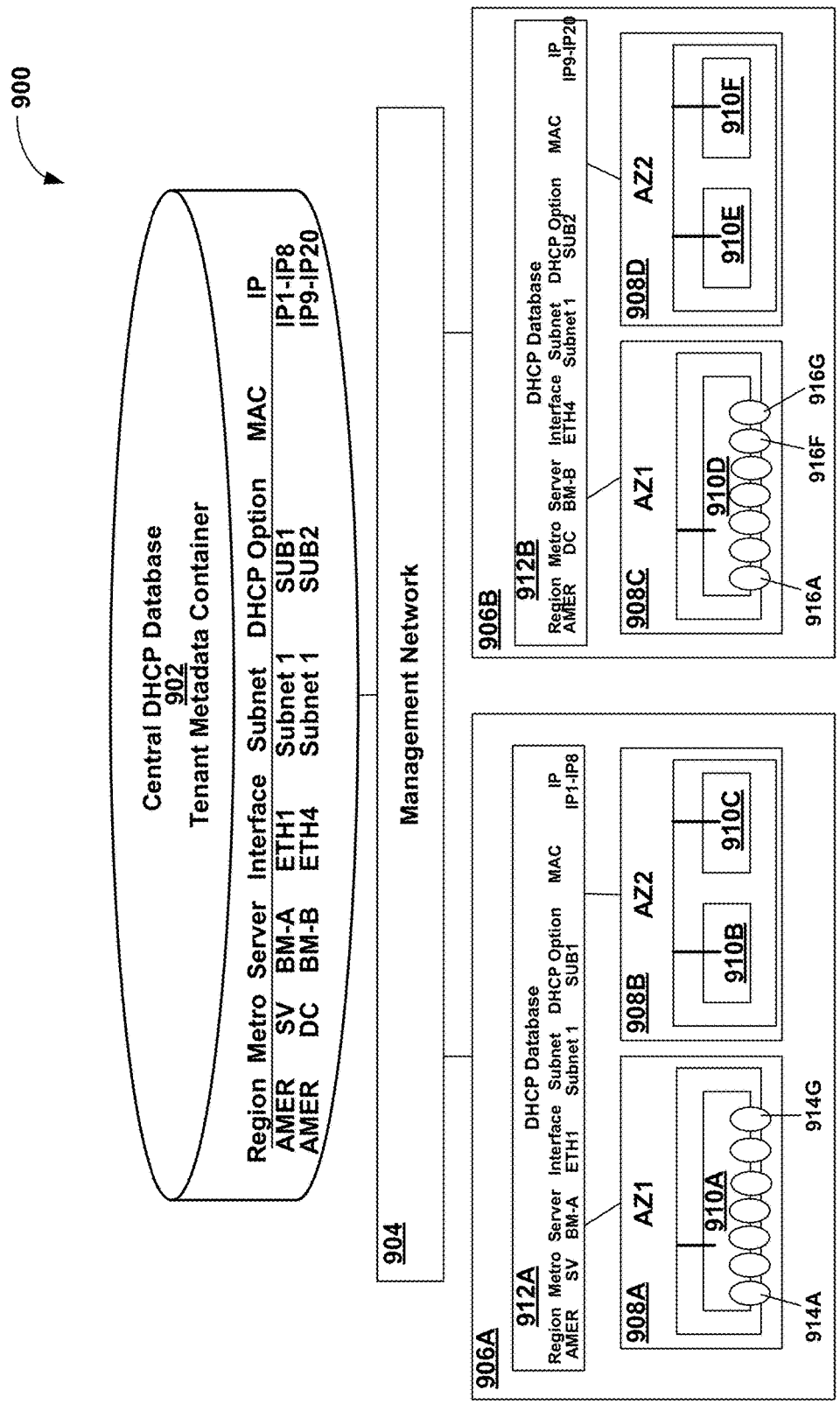
FIGS. 9A-9C are conceptual diagrams depicting an example system and an example method of migrating a virtual machine (VM) from a first server to a second server, in accordance with techniques of this disclosure.
Figure 9B:
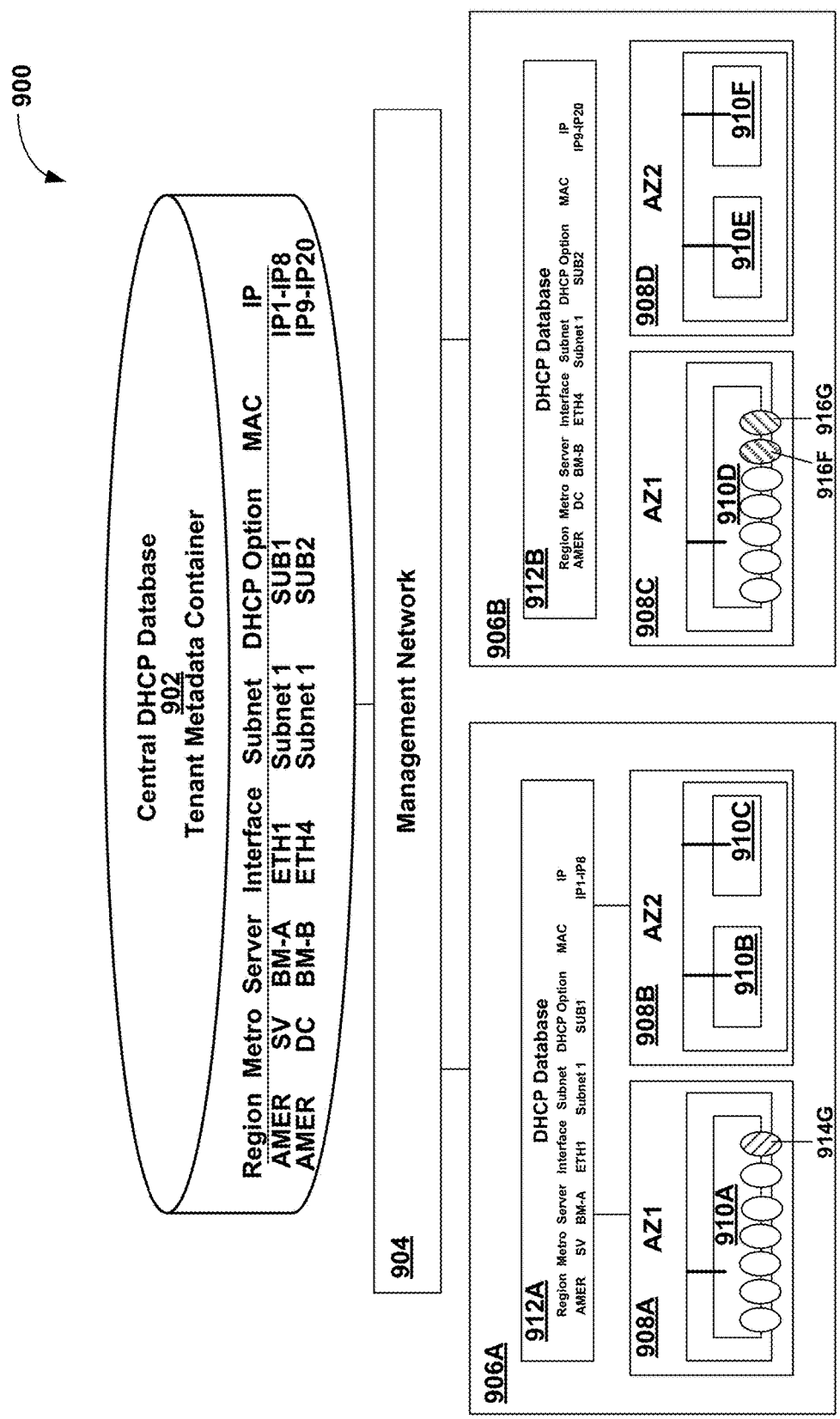
Figure 9C:
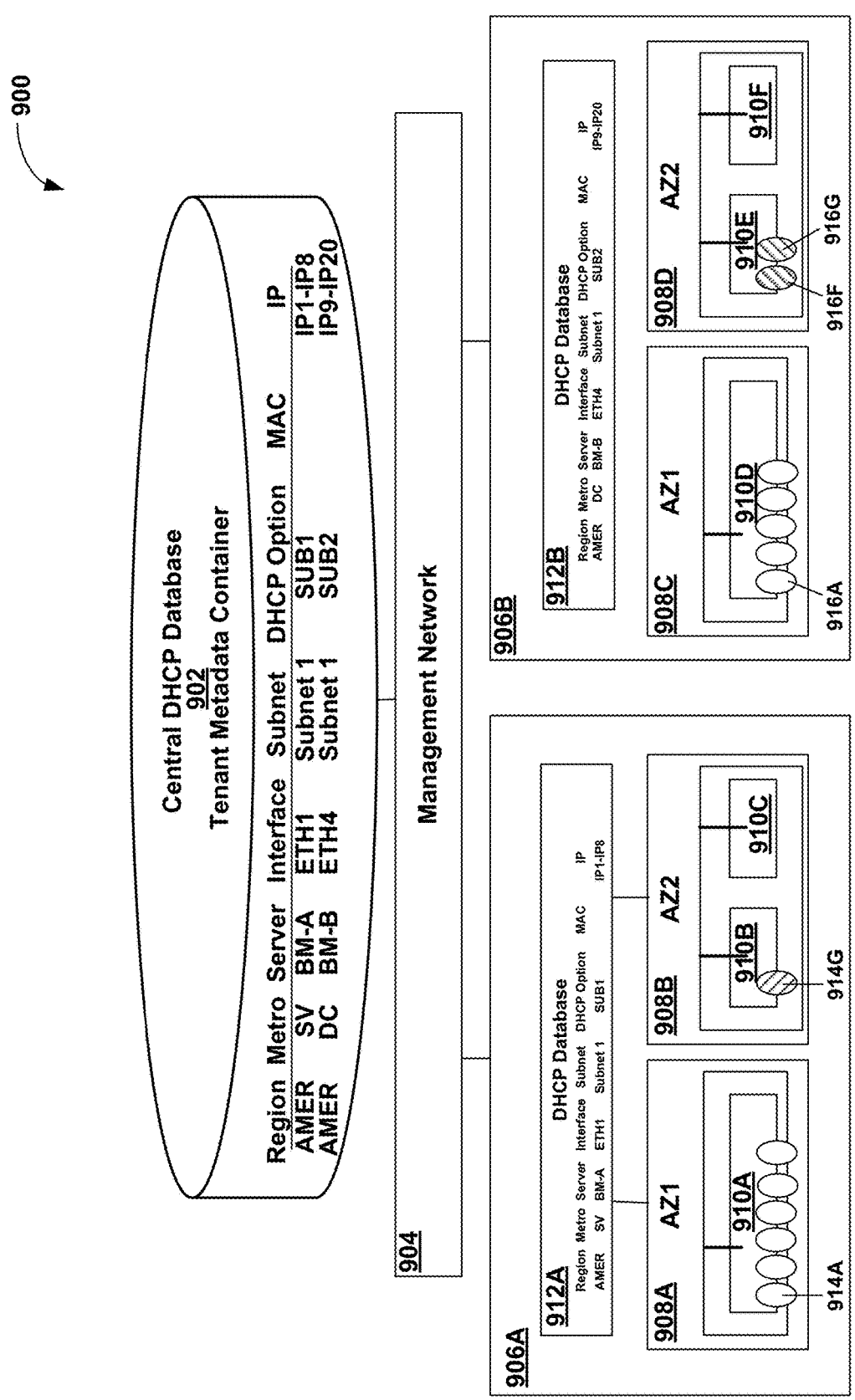

FIGS. 9A-9C are conceptual diagrams depicting an example system and an example method of migrating virtual machines (VMs) from a first server to a second server, in accordance with techniques of this disclosure. In some examples, a tenant of a cloud-computing service may install and run one or more VMs (or other virtual execution environment requiring overlay, e.g., VTEP or other tunnel overlay, IP addresses on one or more of the tenant's leased servers. For each installed VM, the system may designate a corresponding virtual MAC address and an IP address. For example, as shown in the example of FIG. 9A, a tenant has installed VMs 914A-914G (collectively, "VMs 914") on server 910A and VMs 916A-916G (collectively, "VMs 916") on server 910D.

In some scenarios, a tenant may need to migrate one or more of VMs from its current host server to a new server in a different area. For example, as shown in FIG. 9B, the tenant may designate one VM 914G to be migrated from server 910A, and two VMs 916F and 916G to be migrated from server 910D. In conventional systems, similar systems may be configured to migrate a VM from one server to another, and subsequently have a standard DHCP server allocate a new IP address to the VM and reallocate the VM's previous IP address. In such examples, the reallocation of the VM's previous IP address may occasionally result in a system failure for the tenant's application(s), because the system may not always be configured to update references to the VM's IP address throughout the application.

However, in some examples in accordance with this disclosure, system 900 includes a distributed, hierarchical DHCP system configured to provide technical solutions to these and similar types of problems. For example, when initializing a VM, global DHCP 902 is configured to allocate an IP address for the VM and register the virtual MAC address for the VM with an orchestrator. The virtual MAC address may be stored within a database of central DHCP 902 and downloaded to a respective metro DHCP 912.

Accordingly, when system 900 receives user instructions to migrate one or more VMs from a first server 910 to a respective second server 910, the system may be configured to first retrieve the VM's virtual MAC address from the respective metro DHCP 912 and determine whether the virtual MAC address has already been assigned to a corresponding IP address. If the system determines that the virtual MAC address for the VM is already attributed to a respective IP address, the system may migrate the VM to the second server while maintaining the same IP address for the VM and updating the server ID within the central DHCP 902, as shown in FIG. 9C. The updated tenant information may then be downloaded from the central DHCP 902 to the respective metro DHCP 912. For example, as shown in FIG. 9C, system 900 may migrate VM 914G to server 910B, and VMs 916F, 916G to server 910E, while retaining all of the VMs' initial IP addresses. In this way, the systems and techniques of this disclosure may provide for increased stability as well as higher availability for user applications running on a networked cloud computing system 900.

Figure 10:
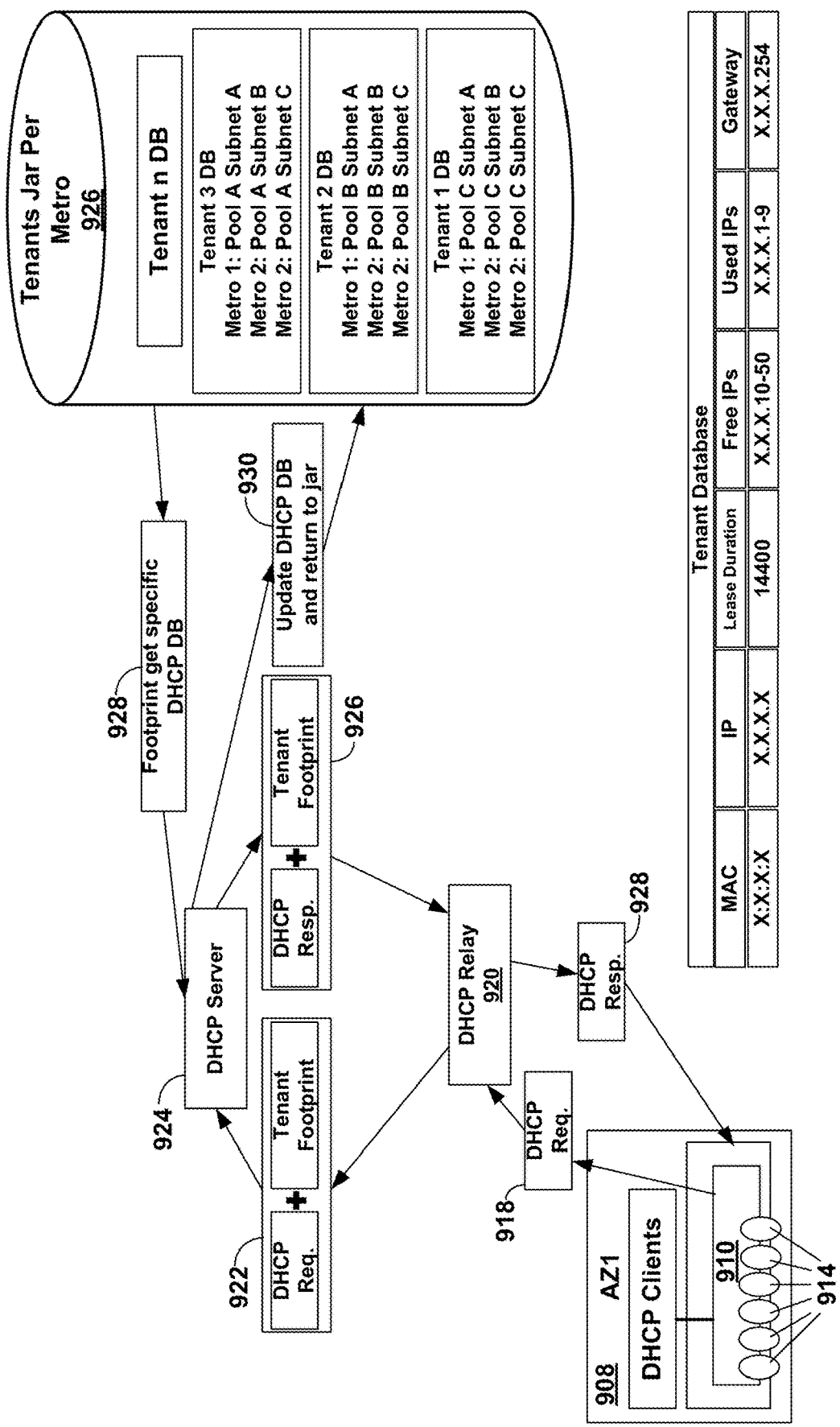
FIG. 10 is a conceptual flow diagram depicting an example lease process for a tenant-aware, distributed DHCP system, in accordance with techniques of this disclosure.

FIG. 10 is a conceptual flow diagram depicting an example lease process for a tenant-aware, distributed DHCP system, in accordance with techniques of this disclosure. A user may install one or more virtual machines 914 on a server 910 housed within a data center 908. In order to allocated IP addresses for the virtual machines 914, the server 910 may transmit a DHCP request 918 to a DHCP relay 920. To identify the tenant from which the DHCP Discovery is originating, the DHCP relay 920 appends a tenant footprint to the DHCP-request data packet and forwards the updated DHCP request 922 to a DHCP server 924, such as a centralized, central DHCP server 902 (FIG. 7). For example, the tenant footprint may include a virtual network identifier (VNI) unique to a particular tenant. Based on the tenant footprint, the DHCP server 924 retrieves, from a DHCP database 926, a tenant metadata container 928 listing all currently registered MAC addresses, IP addresses, interfaces, and subnets attributable to the respective tenant. Based on the DHCP request and the data already stored in the tenant metadata container, the DHCP server 924 allocates one or more additional IP addresses to the tenant and transmits the IP addresses in the form of a DHCP response to DHCP relay 920. DHCP relay 920 strips off the tenant footprint from the data packet and forwards the updated data packet 928 to the requesting server 910. Meanwhile, the DHCP server 924 updates the DHCP database 926 with the newly allocated IP addresses.

Figure 11:
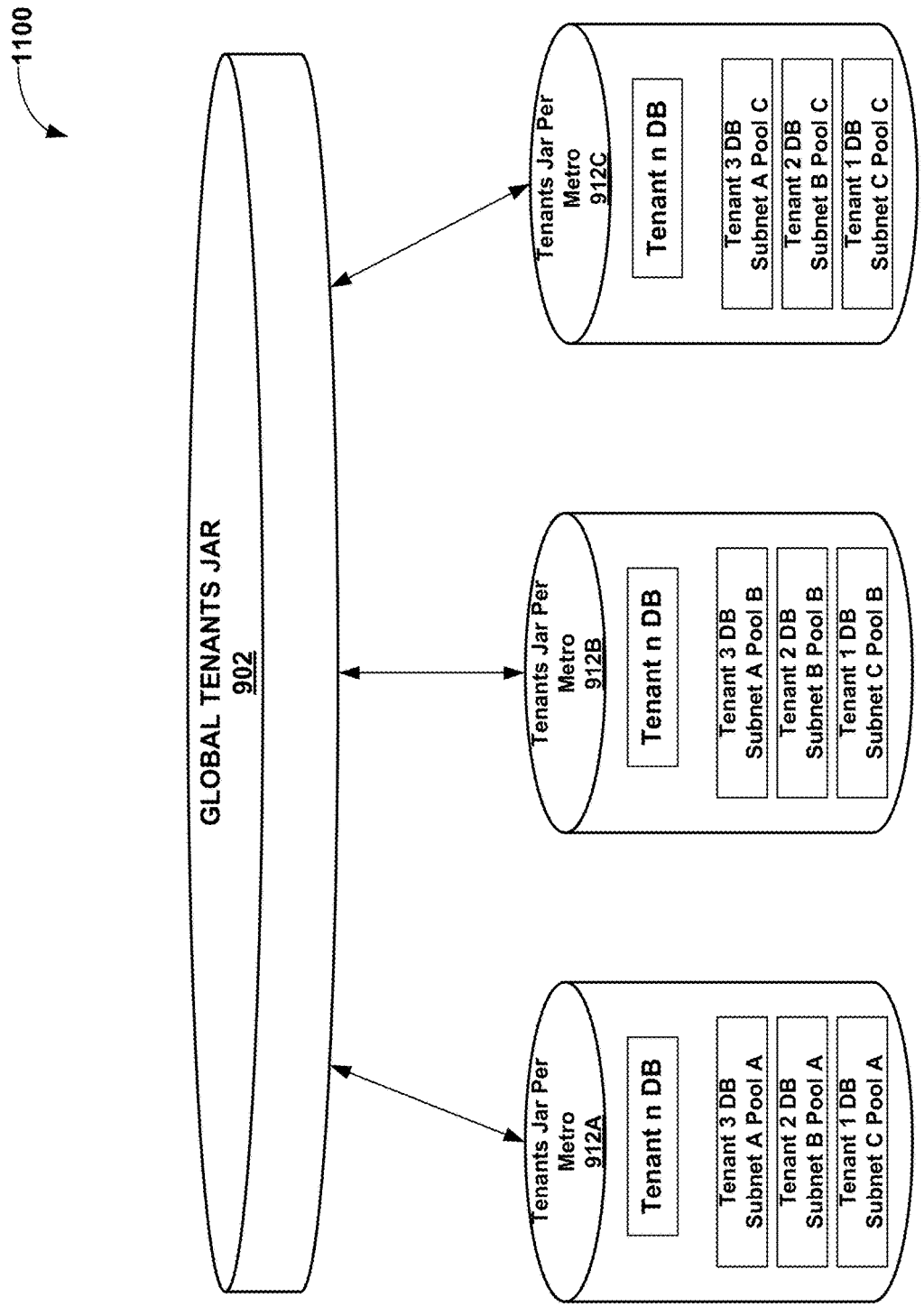
FIG. 11 is a block diagram illustrating a computing system including a distributed, hierarchical DHCP system, in accordance with techniques of this disclosure.

FIG. 11 is a block diagram illustrating a computing system 1100 including a distributed, hierarchical DHCP system, in accordance with techniques of this disclosure. Specifically, system 1100 includes a central DHCP database 902 and a plurality of metro DHCP databases 912A-912C. Central DHCP database 902 contains a regional-specific tenant DHCP database. Metro DHCP databases 912 are each configured to download "jars" or "containers" of metro-specific tenant data from the central DHCP database 902. In other words, system 1100 is configured to synchronize a global tenants jar within the central DHCP 902 with the metro-level tenant jars 912.

Figure 12:
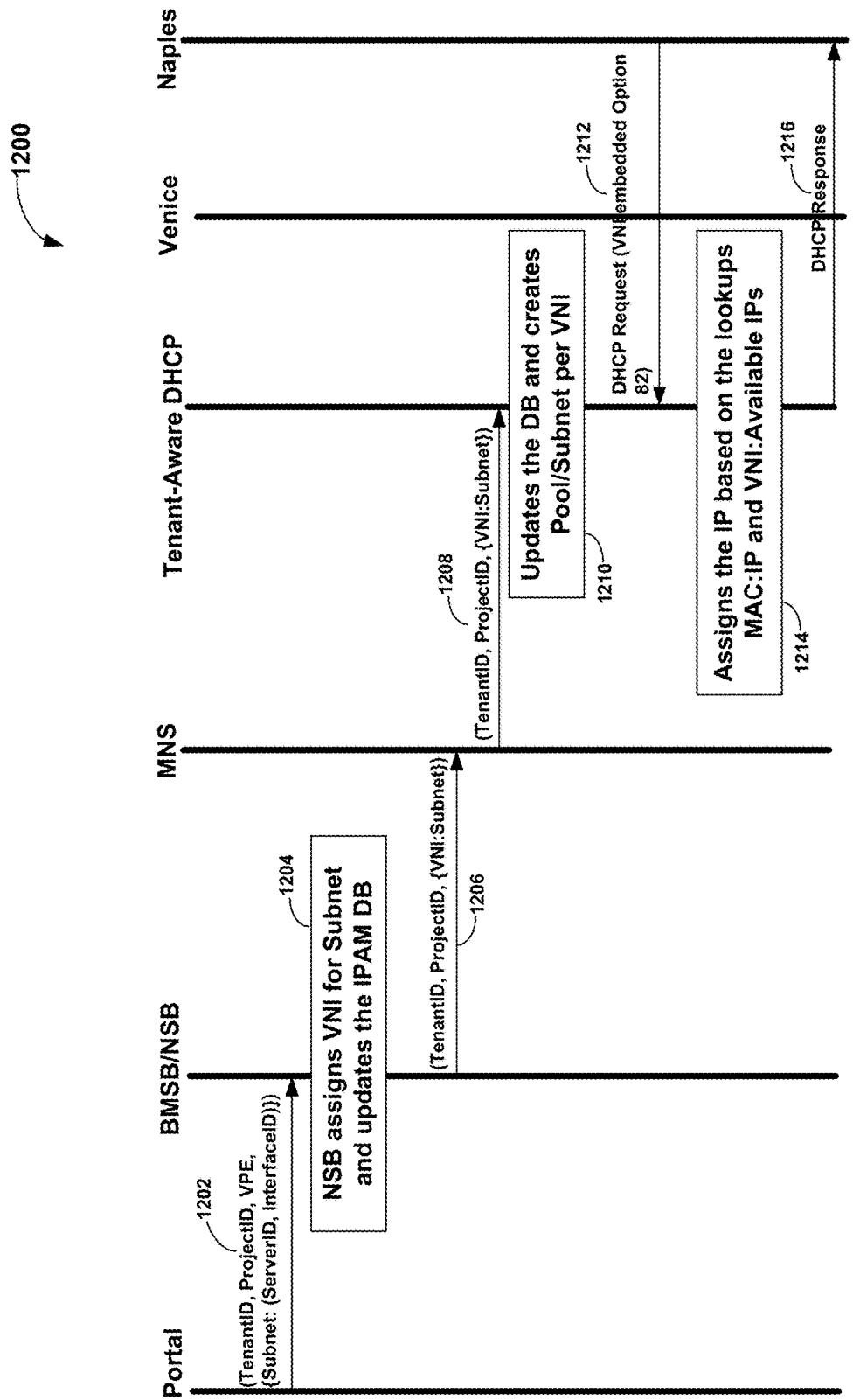
FIG. 12 is a conceptual diagram depicting a method of assigning one or more IP addresses for a common subnet, in accordance with techniques of this disclosure.

FIG. 12 is a conceptual diagram depicting an example method 1200 of assigning one or more overlay IP addresses for a common subnet, in accordance with techniques of this disclosure. Through a user portal, a new user or tenant submits identifying information for a server, virtual machine, or interface in the form of a DHCP request to a BMSB/NSB (1202). As one non-limiting example, the user input may take the format of "(TenantID, ProjectID, VPE, {Subnet: (ServerID, InterfaceID)})."

The NSB may assign a virtual network identifier (VNI) for each subnet and update the IP address management (IPAM) database, such as a DHCP database, to include the new VNI information (1204). The NSB may append the VNI to the DHCP request and then forward the updated data packet to an MNS (1206). As one non-limiting example, the updated DHCP request may take the format of "(TenantID, ProjectID, {VNI:Subnet})." The MNS may forward the updated DHCP request to a tenant-aware DHCP, such as a centralized, central DHCP server (1208). The tenant-aware DHCP creates a new pool or subnet corresponding to each received VNI, and updates the its DHCP database with the new subnet data (1210).

The central DHCP server may subsequently receive another DHCP request to allocate additional IP addresses for one or more of the designated subnets (1212). For example, a user may lease an additional server to be added to an existing subnet, and/or may install a virtual machine on one of the tenant's existing servers. In response to the DHCP request, the central DHCP server may retrieve the tenant's data from the stored DHCP database and assign the new IP addresses based on the lookups "MAC:IP" and "VNI:Available IPs" (1214). The central DHCP may then return the new IP addresses to the requesting server in the form of a DHCP response (1216).

Figure 13:
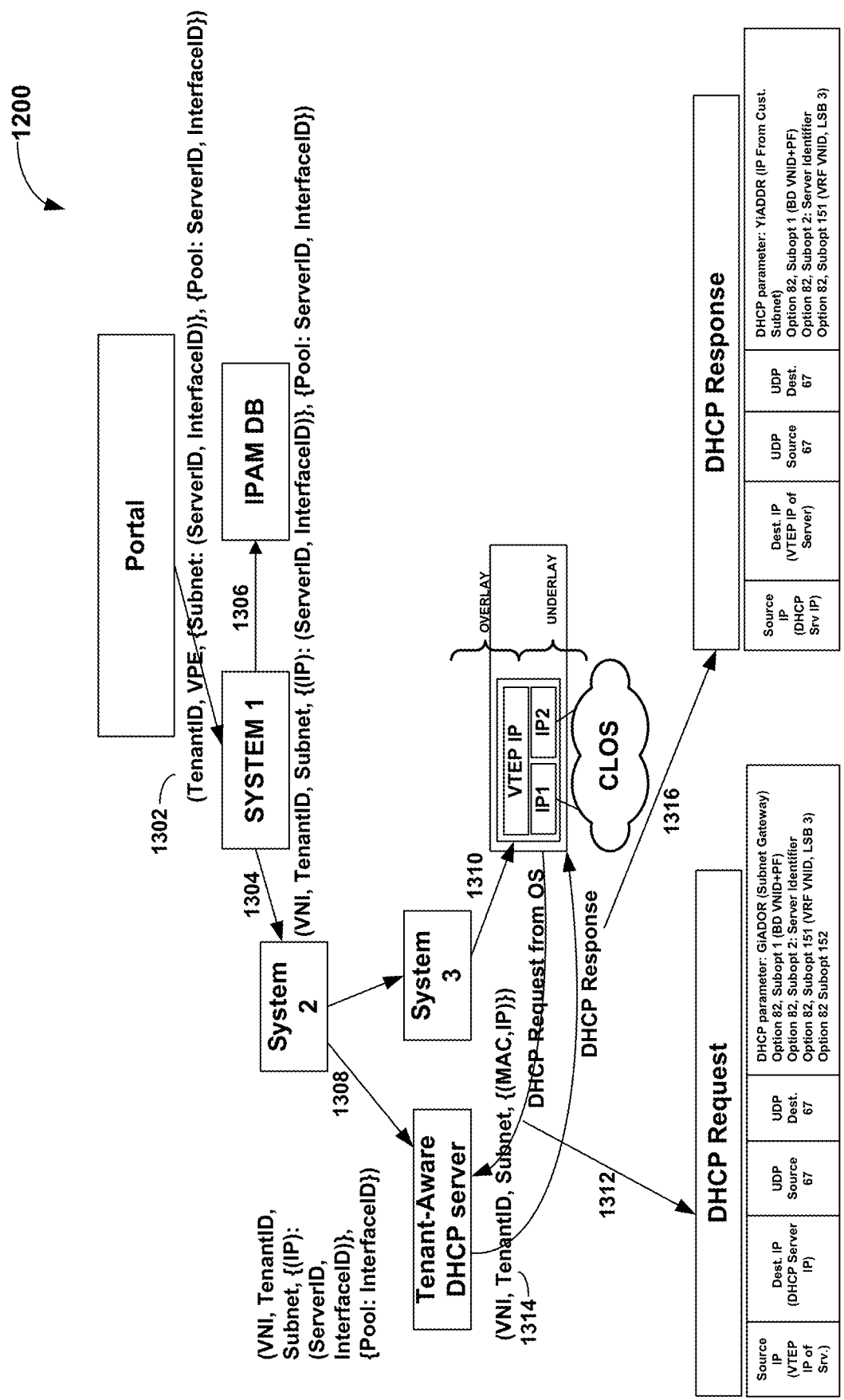
FIG. 13 is a conceptual diagram depicting a method of performing a DHCP request, in accordance with techniques of this disclosure.

FIG. 13 is a conceptual diagram depicting an example method 1300 of assigning one or more overlay IP addresses for a common subnet, in accordance with techniques of this disclosure. Through a user portal, a new user or tenant submits identifying information for a server, virtual machine, or interface to system 1 (1302). As one non-limiting example, the user input may take the format of "(TenantID, VPE, {Subnet: (ServerID, InterfaceID)}, {Pool: ServerID, InterfaceID})." For example, the user provides an IP Pool within the subnet for each port or interface for the Workload (WL) IP assignment. In these examples, there is no need for a customer DHCP server, and WLs may use an existing overlay for WL-to-WL communication between metros. In these examples, the ServerID, InterfaceID is used as a unique key instead of the MAC address. Workloads may correspond to virtual execution environments such as VMs.

The System 1 may assign a virtual network identifier (VNI) for each subnet, append the VNI for the tenantID, and then forward the updated information to a system 2 (1304). As one non-limiting example, the updated DHCP request may take the format of "(VNI, TenantID, Subnet, {(IP): (ServerID, InterfaceID)}, {Pool: ServerID, InterfaceID})." The System 1 may also update the IP address management (IPAM) database, which may include a DHCP database, to include the new VNI information (1306).

System 2 may push the data to a tenant-aware DHCP, such as a distributed DHCP server (1308). System 3 may perform MAC address assignment for the interfaces (1310). The central DHCP server may subsequently receive another DHCP request to allocate additional IP addresses for one or more of the designated subnets (1312). For example, a user may lease an additional server to be added to an existing subnet, and/or may install a virtual machine on one of the tenant's existing servers. In response to the DHCP request, the DHCP server may retrieve the tenant's data from the stored DHCP database and assign the new IP addresses based on the lookup "(VNI, TenantID, Subnet, {(MAC.IP)})" (1314). The DHCP may then return the new IP addresses to the requesting server in the form of a DHCP response (1316). System 1 and System 2 may represent components of a central DHCP server.

Example method 1300 may support IPAllocWL using a more deterministic route configured by the users. For example, the DHCP Relay may insert the Interface ID to the DHCP request option 82. For example, tenant-aware DHCP server may assign the IP based on the ServerID, InterfaceID embedded in option 82.

FIGS. 1-13 each illustrate at least one example cloud exchange, cloud exchange point, data center, computing system or other system. The scope of this disclosure is not, however, limited to the specific systems or configurations illustrated. Accordingly, other example or alternative implementations of systems illustrated herein, beyond those illustrated in the figures, may be appropriate in other instances. Such implementations may include a subset of the devices and/or components included in the example(s) described in the figures and/or may include additional devices and/or components not shown in the figures.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices are shown within the figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the figures, may be appropriate in other instances. Such implementations may include a subset of the devices and/or components included in the figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the figures herein as separate devices may alternatively be implemented as a single device; one or more components illustrated as separate components may alternatively be implemented as a single component. Also, in some examples, one or more devices illustrated in the figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various figures herein may alternatively be implemented as part of another device or component not shown in such figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system comprising:
    a central dynamic host configuration protocol (DHCP) server;
    a first distributed DHCP server and a second distributed DHCP server communicatively coupled to the central DHCP server;
    a first area having DHCP operations managed by the first distributed DHCP server, the first area comprising first one or more data centers housing computing devices configured to request Internet Protocol (IP) addresses from the first distributed DHCP server; and
    a second area having DHCP operations managed by the second distributed DHCP server, the second area comprising second one or more data centers housing computing devices configured to request IP addresses from the second distributed DHCP server,
    wherein the centralized DHCP server is configured to:
        obtain an association of an IP subnet with a tenant, wherein the tenant is associated with a first computing device of the computing devices in the first area and the tenant is associated with a second computing device of the computing devices in the second area, wherein the first computing device is configured to initially execute a virtual machine (VM);
        generate a first record associating a first IP address from a common IP subnet to the first computing device and generate a second record associating a second IP address from the common IP subnet to the second computing device;
        send the first record to the first distributed DHCP server;
        send the first record to the second distributed DHCP server; and
        send the second record to the second distributed DHCP server,
    wherein the first distributed DHCP server is configured to assign, in response to a DHCP request from the first computing device, based on the first record, the first IP address to the VM executed by the first computing device,
    wherein the second distributed DHCP server is configured to assign, in response to a first DHCP request from the second computing device, based on the second record, the second IP address to the second computing device, and
    wherein in response to the VM migrating from the first computing device to the second computing device such that the VM subsequently executes on the second computing device, the second distributed DHCP server is configured to assign, in response to a second DHCP request from the second computing device and based on the first record, the first IP address to the VM when executed by the second computing device.

2. The system of claim 1,
wherein the first record comprises a first identifier for the first computing device,
wherein the first identifier comprises one of a Media Access Control (MAC) address or a combination of a tenant identifier and server identifier,
wherein the DHCP request from the first computing device comprises the first identifier, and
wherein the first distributed DHCP server is configured to map the first identifier to the first record.

3. The system of claim 1, wherein the first area and the second area are geographically-distributed metropolitan areas.

4. The system of claim 1, wherein the first one or more data centers and the second one or more data centers are deployed by a common entity that manages the central DHCP.

5. The system of claim 1, wherein the central DHCP server is configured to assign overlapping IP addresses distinguished by a virtual network identifier (VNI) number indicative of tenant context.

6. The system of claim 1, further comprising a business support system (BSS), the BSS configured to use an application programming interface (API) abstraction to synchronize the central DHCP server with the first distributed DHCP server and the second distributed DHCP server and to abstract a complexity of DHCP high availability upon failure.

7. The system of claim 6, wherein, to synchronize the central DHCP server with the first distributed DHCP server and the second distributed DHCP server the BSS is configured to transmit at least a regional identification and a tenant identification to an API server, the API server in data communication with the first distributed DHCP server and the second distributed DHCP server.

8. The system of claim 7, wherein the first DHCP server comprises a primary DHCP instance and a secondary DHCP instance, and wherein the API server is configured to run health checks on the primary DHCP instance and the secondary DHCP instance to identify a system failure.

9. The system of claim 8, wherein, in response to identifying a system failure of the primary DHCP instance, the API server is configured to replace the primary DHCP instance with the secondary DHCP instance, and abstract the replacement from the BSS.

10. The system of claim 1,
wherein the first distributed DHCP server is configured to output, to the central DHCP server, a MAC address for the VM, the MAC address for the VM received in the DHCP request from the first computing device,
wherein the central DHCP server is configured to generate the first record to include the MAC address for the VM,
wherein the second distributed DHCP server is configured to assign the first IP address to the VM configured to execute on the second computing device based on mapping the MAC address for the VM to the first record, the MAC address for the VM received by the second distributed DHCP server in the second DHCP request.

11. The system of claim 1, wherein to generate the first record, the centralized DHCP server is configured to generate the first record in response receiving, from the first distributed DHCP server, a request to assign an IP address to the VM of the first computing device.

12. A method comprising:
receiving, by a centralized dynamic host configuration protocol (DHCP) server, a DHCP request and a tenant identifier for a first computing device housed within a data center located in a metropolitan region;
assigning, by the centralized DHCP server, an Internet Protocol (IP) address corresponding to a common subnet associated with the tenant identifier;
storing, by the centralized DHCP server, the IP address and a Media Access Control (MAC) address for the first computing device within a distributed DHCP server for the metropolitan region;
retrieving a MAC address for a virtual machine (VM) executing on the first computing device;
determining that the MAC address is assigned to a corresponding IP address;
migrating the VM from the first computing device to a second computing device; and
retaining the IP address for the VM on the second computing device.

13. The method of claim 12, further comprising storing, by the centralized DHCP server, the MAC address, the IP address, a metropolitan region identifier, a server identifier, an interface identifier, and a subnet identifier for the first computing device.

14. The method of claim 12, wherein the data center comprises a first data center, and wherein the common subnet comprises the first computing device and a second computing device housed within a second data center, wherein the first data center is distinct from the second data center.

15. The method of claim 14, wherein the metropolitan region comprises a first metropolitan region, and wherein the second data center is located in a second metropolitan region.

16. A central dynamic host configuration protocol (DHCP) server communicatively coupled to a first distributed DHCP server and a second distributed DHCP server, the central DHCP server comprising:
processing circuitry coupled to memory, the processing circuitry configured to:
obtain an association of an Internet Protocol (IP) subnet with a tenant, wherein the tenant is associated with a first computing device of a plurality of computing devices in a first area and the tenant is associated with a second computing device of a plurality of computing devices in a second area, wherein the first computing device is configured to initially execute a virtual machine (VM), wherein the first area has DHCP operations managed by the first distributed DHCP server and the second area has DHCP operations managed by the second distributed DHCP server;
generate a first record associating a first IP address from a common IP subnet to the first computing device and generate a second record associating a second IP address from the common IP subnet to the second computing device;
send the first record to the first distributed DHCP server;
send the first record to the second distributed DHCP server; and
send and the second record to the second distributed DHCP server, wherein the first distributed DHCP server assigns, in response to a first DHCP request from the first computing device, based on the first record, the first IP address to the VM executed by the first computing device, wherein the second distributed DHCP server is configured to assign, in response to a first DHCP request from the second computing device, based on the second record, the second IP address to the second computing device, and wherein in response to the VM migrating from the first computing device to the second computing device such that the VM subsequently executes on the second computing device, the second distributed DHCP server assigns, in response to a second DHCP request from the second computing device and based on the first record, the first IP address to the VM when executed by the second computing device.

17. The central DHCP server of claim 16, wherein the first record comprises a first identifier for the first computing device;

wherein the first identifier comprises one of a Media Access Control (MAC) address or a combination of a tenant identifier and server identifier;

wherein the DHCP request from the first computing device comprises the first identifier; and wherein the first distributed DHCP server is configured to map the first identifier to the first record.

18. The central DHCP server of claim 16, wherein the central DHCP server is configured to assign overlapping IP addresses distinguished by a virtual network identifier (VNI) number indicative of tenant context.

* * * * *